United States Patent
Lee et al.

(10) Patent No.: US 11,651,580 B2
(45) Date of Patent: May 16, 2023

(54) FINGERPRINT AUTHENTICATION DEVICE, DISPLAY DEVICE INCLUDING THE SAME, AND METHOD OF AUTHENTICATING FINGERPRINT

(71) Applicant: SAMSUNG DISPLAY CO., LTD., Yongin-si (KR)

(72) Inventors: Soon Gyu Lee, Yongin-si (KR); Jin A Kang, Yongin-si (KR); Mi Young Kim, Yongin-si (KR); Jin Woo Kim, Yongin-si (KR); Kyoung Hun Been, Yongin-si (KR); Byeong Kyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 102 days.

(21) Appl. No.: 17/206,123

(22) Filed: Mar. 19, 2021

(65) Prior Publication Data
US 2021/0397813 A1  Dec. 23, 2021

(30) Foreign Application Priority Data
Jun. 22, 2020 (KR) .................. 10-2020-0076005

(51) Int. Cl.
| G06V 40/12 | (2022.01) |
| G06T 5/00 | (2006.01) |
| G06N 20/00 | (2019.01) |
| G06V 40/13 | (2022.01) |
| G06V 40/50 | (2022.01) |

(52) U.S. Cl.
CPC ......... *G06V 40/1365* (2022.01); *G06N 20/00* (2019.01); *G06T 5/002* (2013.01); *G06V 40/1306* (2022.01); *G06V 40/1318* (2022.01); *G06V 40/1335* (2022.01); *G06V 40/50* (2022.01); *G06T 2207/20081* (2013.01); *G06T 2207/30168* (2013.01)

(58) Field of Classification Search
CPC ........... G06V 40/1365; G06V 40/1318; G06V 40/1306; G06V 40/50; G06V 40/1335; G06N 20/00; G06T 5/002; G06T 2207/20081; G06T 2207/30168
See application file for complete search history.

(56) References Cited

U.S. PATENT DOCUMENTS

| 9,471,765 B1 | 10/2016 | Setterberg et al. |
| 2016/0171280 A1 | 6/2016 | Han et al. |
| 2017/0076132 A1 | 3/2017 | Sezan et al. |

(Continued)

FOREIGN PATENT DOCUMENTS

| CN | 105654025 | 1/2019 |
| KR | 10-2016-0072705 | 6/2016 |

(Continued)

*Primary Examiner* — Lixi C Simpson
(74) *Attorney, Agent, or Firm* — H.C. Park & Associates, PLC

(57) ABSTRACT

A fingerprint authentication device includes: a sensor unit configured to output a sensing signal by sensing a fingerprint; an image processing unit configured to generate a fingerprint image based on the sensing signal; a storage unit configured to store a template including an enrolled image; and a learning unit configured to generate a first pseudo image and add the first pseudo image to the template.

19 Claims, 18 Drawing Sheets

(56) References Cited

U.S. PATENT DOCUMENTS

| | | | | |
|---|---|---|---|---|
| 2018/0032790 A1* | 2/2018 | Zhang | ............... | G06V 40/1335 |
| 2019/0122024 A1 | 4/2019 | Schwartz et al. | | |
| 2019/0188448 A1 | 6/2019 | Kim et al. | | |
| 2020/0228336 A1* | 7/2020 | Streit | ................ | G06F 7/5443 |
| 2020/0409191 A1* | 12/2020 | He | ................ | G02F 1/1335 |
| 2021/0117721 A1* | 4/2021 | Hall | ................ | G06K 9/6255 |

FOREIGN PATENT DOCUMENTS

| | | |
|---|---|---|
| KR | 10-1898636 | 9/2018 |
| KR | 10-2019-0074782 | 6/2019 |

\* cited by examiner

FIG. 7
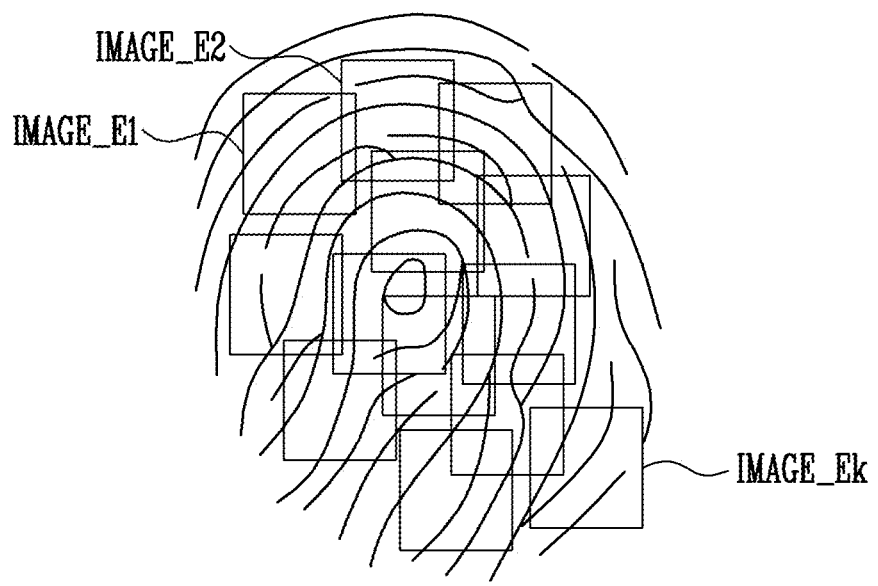
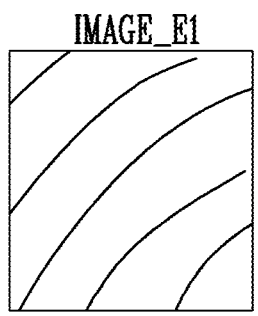
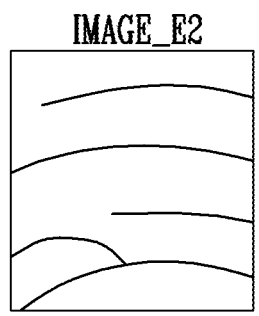
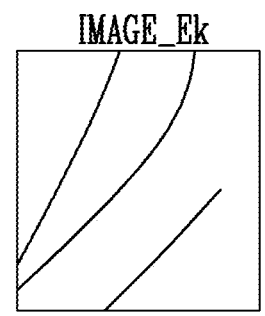

IMAGE_L: IMAGE_HIGH, IMAGE_LOW

FIG. 10
IMAGE2_1
(Exposure time: 100 ms)
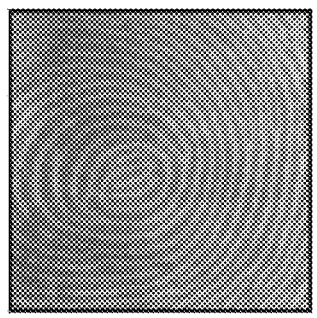
IMAGE3_1
(Exposure time: 60 ms)
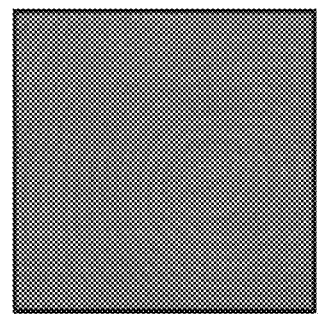
IMAGE2_2
(Frequency: 12MHz)
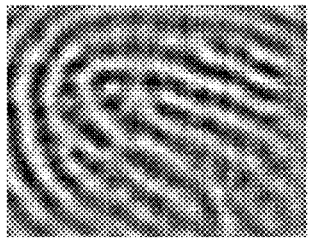
IMAGE3_2
(Frequency: 10MHz)
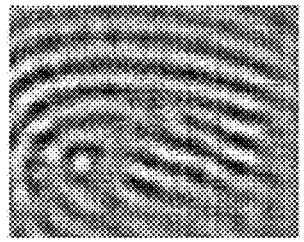

FINGERPRINT AUTHENTICATION DEVICE, DISPLAY DEVICE INCLUDING THE SAME, AND METHOD OF AUTHENTICATING FINGERPRINT

CROSS-REFERENCE TO RELATED APPLICATION

This application claims priority from and the benefit of Korean Patent Application No. 10-2020-0076005 filed on Jun. 22, 2020, which is hereby incorporated by reference for all purposes as if fully set forth herein.

BACKGROUND

Field

Exemplary implementations of the invention relate generally to a fingerprint authentication device, a display device including the same, and a method of authenticating a fingerprint and more specifically, to a fingerprint authentication device using a learning technique, a display device including the same, and a method of authenticating a fingerprint.

DISCUSSION OF THE BACKGROUND

Recently, as display devices such as smartphones and tablet PCs are used in many fields, a biometric authentication method using a fingerprint of a user, and the like has been widely used. In order to provide a fingerprint sensing function, a fingerprint sensor may be built in a display device or be attached to the top and/or the bottom of the display device. The display device integrated with the fingerprint sensor is referred to as a Fingerprint on Display (FoD).

The FoD may include, for example, a photosensitive type fingerprint sensor. The photosensitive type FoD may use, as a light source, a light emitting device included in a pixel, and include a photo sensor array as the fingerprint sensor. The photo sensor array may be implemented as, for example, a CMOS Image Sensor (CIS).

The FoD may acquire a fingerprint image through the fingerprint sensor, and compare the fingerprint image with a pre-enrolled fingerprint image (e.g., a template including the same), thereby authenticating a fingerprint (i.e., authenticating that a sensed fingerprint is an enrolled fingerprint of a user).

According to a state of skin (e.g., when the skin is dry or when the skin is contracted) or an authentication environment (e.g., when surroundings are very bright or dark), the accuracy of fingerprint recognition may be lowered, and a fingerprint authentication result of the same fingerprint may be changed.

The above information disclosed in this Background section is only for understanding of the background of the inventive concepts, and, therefore, it may contain information that does not constitute prior art.

SUMMARY

Applicant discovered that when a state of skin of a user or an authentication environment is not normal, the accuracy of fingerprint recognition of a fingerprint authentication device of a display device is degraded.

Fingerprint authentication devices of display devices constructed according to the principles and exemplary implementations of the invention are capable of improving the accuracy of fingerprint authentication by using learning techniques of fingerprint images.

Methods of authenticating a fingerprint according to the principles and exemplary of the invention are capable of improving the accuracy of the fingerprint authentication by using learning techniques of fingerprint images.

Additional features of the inventive concepts will be set forth in the description which follows, and in part will be apparent from the description, or may be learned by practice of the inventive concepts.

According to one or more exemplary embodiments of the invention, a fingerprint authentication device includes: a sensor unit configured to output a sensing signal by sensing a fingerprint; an image processing unit configured to generate a fingerprint image based on the sensing signal; a storage unit configured to store a template including an enrolled image; and a learning unit configured to generate a first pseudo image and add the first pseudo image to the template.

A signal-to-noise ratio of the first pseudo image may be smaller than that of the enrolled image.

The learning unit may be configured to convert the enrolled image into the first pseudo image by using a first image conversion model.

The image processing unit may be configured to generate a first fingerprint image in a fingerprint enrollment period, and may be configured to generate a second fingerprint image in a fingerprint authentication period, wherein the enrolled image may include at least a portion of the first fingerprint image, and wherein the first pseudo image may be different from the second fingerprint image.

The learning unit may be configured to set the first image conversion model through learning of fingerprint images for learning, which are provided from outside of the fingerprint authentication device, and wherein the fingerprint images for learning may include high-quality fingerprint images of which signal-to-noise ratios are within a reference quality range and low-quality fingerprint images of which signal-to-noise ratios are out of the reference quality range with respect to a plurality of objects.

The fingerprint authentication device may further include an authentication unit configured to compare the fingerprint image generated by the image processing unit with the template, and configured to output a comparison result, wherein the image processing unit may be configured to generate a third fingerprint image corresponding to the second fingerprint image while changing a driving condition of the sensor unit in the fingerprint authentication period, the second fingerprint image and the third fingerprint image obtained from a substantially same fingerprint, wherein a signal-to noise ratio of the third fingerprint image may be smaller than that of the second fingerprint image, and wherein the storage unit may be configured to store the second fingerprint image and the third fingerprint image based on the comparison result of the authentication unit.

The sensor unit may include a photo sensor to configured to sense light reflected by the fingerprint, wherein the image processing unit may be configured to generate the second fingerprint image by receiving the reflected light for a first exposure time through the sensor unit, and wherein the image processing unit may be configured to generate the third fingerprint image by receiving the reflected light for a second exposure time through the sensor unit.

The second exposure time may be shorter than the first exposure time.

The sensor unit may include an ultrasonic sensor configured to sense an ultrasonic wave reflected by the fingerprint, wherein the image processing unit may be configured to generate the second fingerprint image by emitting an ultrasonic wave having a first frequency through the sensor unit, and wherein the image processing unit may be configured to generate the third fingerprint image by emitting an ultrasonic wave having a second frequency through the sensor unit.

The second frequency may be lower than the first frequency.

The learning unit may be configured to set a second image conversion model by learning of the second fingerprint image and the third fingerprint image, may be configured to convert the first fingerprint image into a second pseudo image by using the second image conversion model, and may be configured to add the second pseudo image to the template.

The learning unit may be configured to update the first image conversion model by additionally learning of the second fingerprint image and the third fingerprint image, may be configured to convert the first fingerprint image into a third pseudo image by using the updated first image conversion model, and may be configured to add the third pseudo image to the template.

The image processing unit may be configured to further generates a third fingerprint image corresponding to the second fingerprint image while changing a driving condition of the sensor unit in the fingerprint authentication period, the second fingerprint image and the third fingerprint image obtained from a substantially same fingerprint, wherein the learning unit may be configured to set or update the first image conversion model by learning of at least one of the first and second fingerprint images and the third fingerprint image, and wherein a signal-to-noise ratio of the third fingerprint image may be smaller than that of the second fingerprint image.

The sensor unit may include a photo sensor configured to sense light reflected by the fingerprint, wherein the image processing unit may be configured to generate the second fingerprint image by receiving the reflected light for a first exposure time through the sensor unit, and wherein the image processing unit may be configured to generate the third fingerprint image by receiving the reflected light for a second exposure time through the sensor unit.

The sensor unit may include an ultrasonic sensor configured to sense an ultrasonic wave reflected by the fingerprint, wherein the image processing unit may be configured to generate the second fingerprint image by emitting an ultrasonic wave having a first frequency through the sensor unit, and wherein the image processing unit may be configured to generate the third fingerprint image by emitting an ultrasonic wave having a second frequency through the sensor unit.

The fingerprint authentication device may further include an authentication unit configured to compare the fingerprint image generated by the image processing unit with the template, and configured to output a comparison result, wherein the image processing unit may be configured to generate a converted fingerprint image by increasing a signal-to-noise ratio of the fingerprint image, using the first image conversion model, and wherein the authentication unit may be configured to compare the converted fingerprint image with the template.

The authentication unit may be configured to compare the converted fingerprint image with the template based on a first comparison result obtained by comparing the fingerprint image with the template, and is configured to output a second comparison result.

According to one or more other exemplary embodiments of the invention, a display device includes: a display panel including pixels emitting light; and a fingerprint authentication device disposed on a bottom of the display panel, the fingerprint authentication device configured to sense a fingerprint based on a signal reflected by the fingerprint, wherein the fingerprint authentication device includes: a sensor unit configured to output a sensing signal by sensing a fingerprint; an image processing unit configured to generate a fingerprint image based on the sensing signal; a storage unit configured to store a template including an enrolled image; and a learning unit configured to generate a first pseudo image and to add the first pseudo image to the template.

A signal-to-noise ratio of the first pseudo image may be smaller than that of the enrolled image, and wherein the learning unit may be configured to convert the enrolled image into the first pseudo image by using a first image conversion model.

The sensor unit may be a photo sensor configured to sense the light reflected by the fingerprint or an ultrasonic sensor configured to emit an ultrasonic wave toward the fingerprint and to receive at least a portion of the ultrasonic wave reflected by the fingerprint.

According to one or more exemplary implementations of the invention, a method of authenticating a fingerprint includes the steps of: generating a first fingerprint image of a first object through a sensor unit; adding, to a template, an enrolled image including at least a portion of the first fingerprint image; generating a pseudo image based on the enrolled image; and adding the pseudo image to the template.

A signal-to-noise ratio of the pseudo image may be smaller than that of the enrolled image.

The step of generating of the pseudo image may include the steps of: setting a first image conversion model through learning of fingerprint; and converting the enrolled image into the pseudo image by using the first image conversion model, and wherein the fingerprint images may include high-quality fingerprint images of which signal-to-noise ratios are within a reference quality range and low-quality fingerprint images of which signal-to-noise ratios are out of the reference quality range, with respect to a plurality of objects.

The method may further include the steps of: generating a second fingerprint image through the sensor unit; and comparing the second fingerprint image with the template and outputting a comparison result.

The step of generating of the second fingerprint image may include the step of generating a third fingerprint image corresponding to the second fingerprint image while changing a driving condition of the sensor unit, the second fingerprint image and the third fingerprint image obtained from a substantially same object, and wherein a signal-to-noise ratio of the third fingerprint image is lower than that of the second fingerprint image.

The method may further include the steps of: storing the second fingerprint image and the third fingerprint image based on the comparison result; setting a second image conversion model by learning of the second fingerprint image and the third fingerprint image; converting the enrolled image into a second pseudo image by using the second image conversion model; and adding the second pseudo image to the template.

The sensor unit may include a photo sensor configured to sense light reflected by a fingerprint, and wherein the step of generating of the third fingerprint image may include the steps of: generating the second fingerprint image by receiving the reflected light for a first exposure time through the sensor unit; and generating the third fingerprint image by receiving the reflected light for a second exposure time through the sensor unit.

The sensor unit may include an ultrasonic sensor configured to sense an ultrasonic wave reflected by a fingerprint, and wherein the step of generating of the third fingerprint image may include the steps of: generating the second fingerprint image by emitting an ultrasonic wave having a first frequency through the sensor unit; and generating the third fingerprint image by emitting an ultrasonic wave having a second frequency through the sensor unit.

The method may further include the steps of: setting a first image conversion model through learning of fingerprint images; generating fingerprint images having different signal-to-noise ratios with respect to a first object while changing a driving condition of the sensor unit; and updating the first image conversion model by learning of the fingerprint images.

The method may further include the steps of: generating a second fingerprint image through the sensor unit; comparing the second fingerprint image with the template and outputting a first comparison result; generating a converted fingerprint image by increasing a signal-to-noise ratio of the second fingerprint image, using an image conversion model based on the first comparison result; and comparing the converted fingerprint image with the template and outputting a second comparison result.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7 is a diagram illustrating a template used in the controller of FIG. 5.

FIG. 10 is a diagram illustrating fingerprint images used for real-time learning of the controller of FIG. 5.

DETAILED DESCRIPTION

Figure 1A:
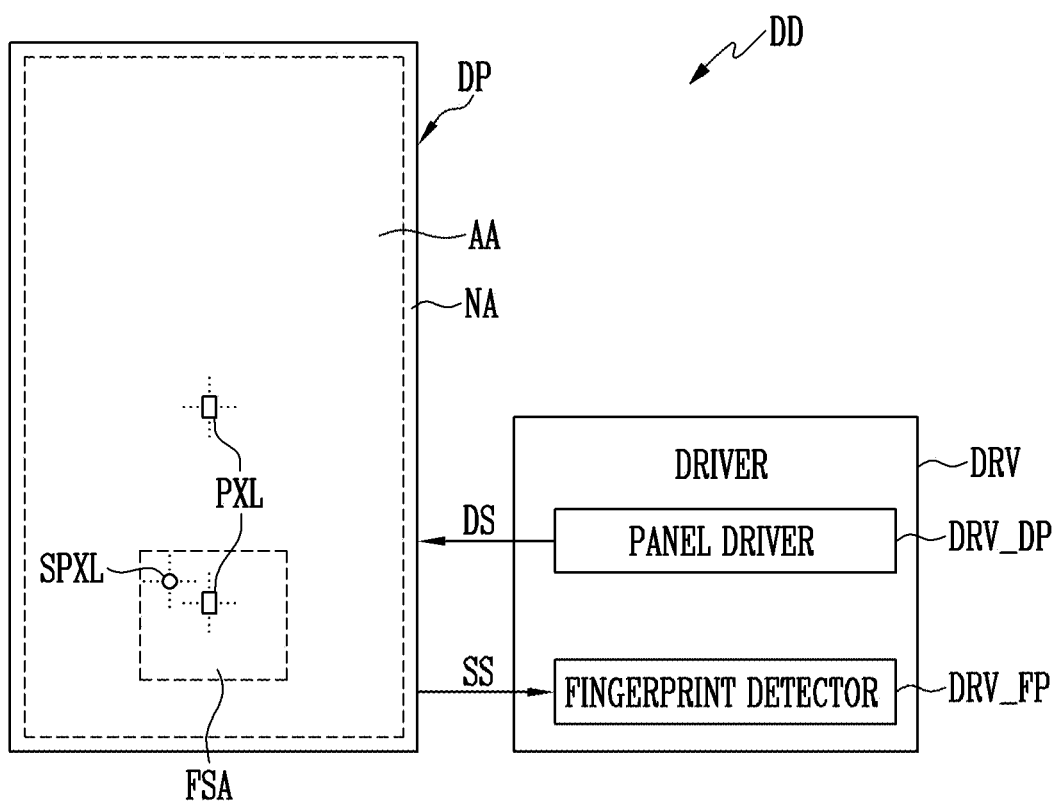
FIG. 1A is a block diagram schematically illustrating an exemplary embodiment of a display device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but exemplary embodiments are not limited thereto. Thicknesses of several portions and regions are exaggerated for clear expressions.

Figure 1B:
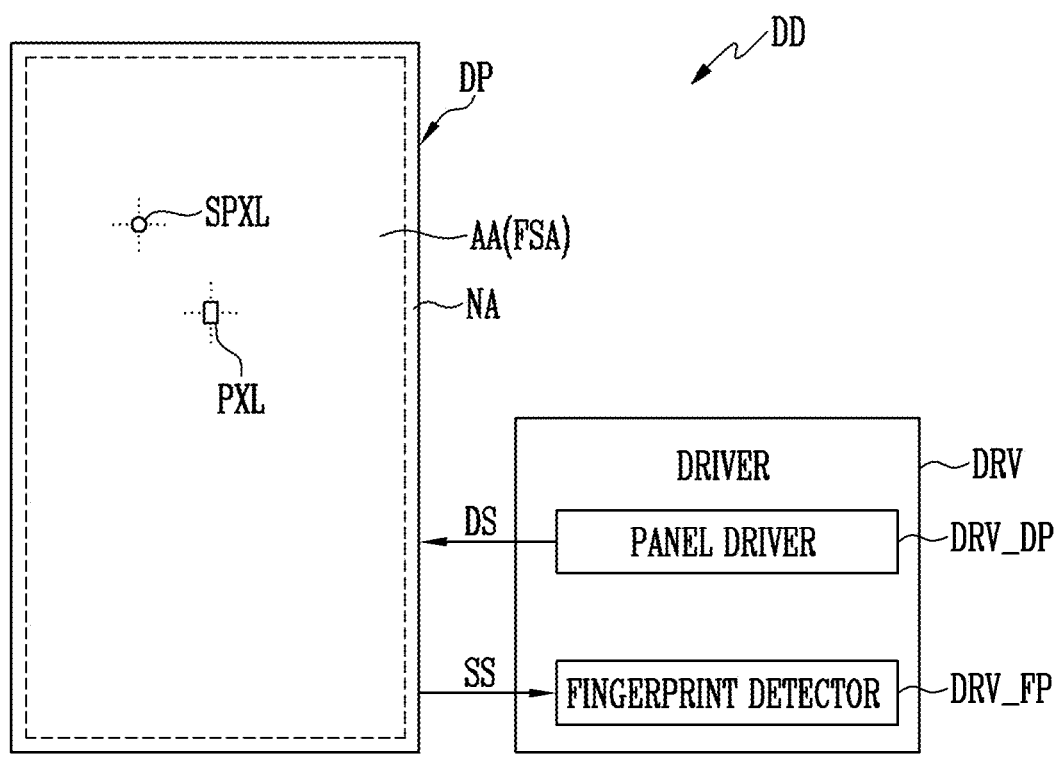
FIG. 1B is a block diagram schematically illustrating another exemplary embodiment of the display device of FIG. 1A.

FIG. 1A is a block diagram schematically illustrating an exemplary embodiment of a display device constructed according to the principles of the invention. FIG. 1B is a block diagram schematically illustrating another exemplary embodiment of the display device shown in FIG. 1A. For descriptive convenience, although a case where a display panel DP and a driver DRV are separated from each other is illustrated in FIGS. 1A and 1B, exemplary embodiments are not limited thereto. More specifically, the whole or a portion of the driver DRV may be integrally implemented with the display panel DP.

Referring to FIGS. 1A and 1B, the display device DD may include the display panel DP and the driver DRV. The driver DRV may include a panel driver DRV_DP and a fingerprint detector DRV_FP (e.g., a fingerprint authentication unit).

The whole or at least a portion of the display device DD may have flexibility.

The display panel DP includes a display area AA and a non-display area NA. The display area AA is an area in which a plurality of pixels PXL (e.g., a plurality of sub-pixels) are provided, and may be referred to as an active area. In various exemplary embodiments, each of the pixels PXL may include at least one light emitting device. The display device DD drives the pixels PXL, corresponding to image data provided from the outside, thereby displaying an image in the display area AA.

In an exemplary embodiment, the display area AA may include a fingerprint sensing area FSA. The fingerprint sensing area FSA may include at least some pixels PXL among the pixels PXL disposed in the display area AA.

In an exemplary embodiment, as shown in FIG. 1A, at least a portion of the display area AA may be set as the fingerprint sensing area FSA. In another exemplary embodiment, as shown in FIG. 1B, the whole of the display area AA may be set as the fingerprint sensing area FSA. When a fingerprint is sensed, a fingerprint sensing operation may be performed on only a portion at which a touch of a user is substantially made.

For example, although an example in which only one fingerprint sensing area FSA is formed in the display area AA is illustrated in FIG. 1A, exemplary embodiments are not limited thereto. For example, a plurality of fingerprint sensing areas FSA arranged regularly or irregularly may be formed in the display area AA.

Also, although an example in which the fingerprint sensing area FSA is formed in at least a portion of the display area AA is illustrated in FIG. 1A, exemplary embodiments are not limited thereto. In various exemplary embodiments, the display area AA and the fingerprint sensing area FSA may be provided to overlap each other in only at least a partial area.

The non-display area NA is an area disposed at the periphery of the display area AA, and may be referred to as a non-active area. For example, the non-display area NA may include a line area, a pad area, various dummy areas, and the like.

In an exemplary embodiment, the display device DD may further include a plurality of sensor pixels SPXL disposed in the fingerprint sensing area FSA.

In an exemplary embodiment, each of the sensor pixels SPXL may be configured as a photo sensor for sensing light. When light emitted from a light source (e.g., pixel PXL) included in the display device DD is reflected by a finger of a user, each of the sensor pixels SPXL may sense the reflected light and output a corresponding electrical signal (e.g., a voltage signal).

The electrical signal of each of the sensor pixels SPXL may constitute one point in a fingerprint image (i.e., a point of light and shade or a pixel as a minimum unit constituting the fingerprint image). Reflected lights incident into each of the sensor pixels SPXL may have different optical characteristics (e.g., frequencies, wavelengths, sizes, etc.) according to whether the reflected lights are caused by valleys or ridges of a fingerprint formed on the finger, a palm pattern of palm, or a dermatoglyphic pattern of skin of the user. Therefore, the sensor pixels SPXL may output a sensing signal SS having different electrical characteristics, corresponding to the optical characteristics of the reflected lights.

When the sensor pixels SPXL are arranged in the fingerprint sensing area FSA, the sensor pixels SPXL may overlap the pixels PXL or be disposed at the periphery of the pixels PXL. For example, some or all of the sensor pixels SPXL may overlap the pixels PXL or be disposed between the pixels PXL. In various exemplary embodiments, the sensor pixels SPXL and the pixels PXL may have the same size or different sizes. The relative size and arrangement between the sensor pixels SPXL and the pixels PXL may be varied.

When the sensor pixels SPXL are disposed adjacent to the pixels PXL or overlap the pixels PXL at at least portions, the sensor pixels SPXL may use, as a light source, the light emitting device included in each pixel PXL. Therefore, the sensor pixels SPXL along with the light emitting devices included in the pixels PXL may constitute a photosensitive type fingerprint sensor. As described above, when a display device having a built-in fingerprint sensor is configured by using the pixels PXL as a light source, without any external light source, the module thickness of the photosensitive type fingerprint sensor or the display device having the photosensitive type fingerprint sensor is decreased, and manufacturing cost is reduced.

In another exemplary embodiment, the sensor pixels SPXL may be configured as an ultrasonic sensor for sensing ultrasonic waves. The sensor pixels SPXL may emit an ultrasonic signal, and output corresponding electrical signals (e.g., a sensing signal SS) by sensing an ultrasonic wave reflected by the finger of the user.

In various exemplary embodiments, the sensor pixels SPXL may be arranged on the other surface (e.g., a rear surface of the display panel DP) facing a surface (e.g., a front surface of the display panel DP) on which an image is displayed. However, exemplary embodiments are not limited thereto. For example, the sensor pixels SPXL may be disposed more adjacent to the front surface of the display panel DP than the pixels PXL.

The driver DRV may drive the display panel DP. For example, the driver DRV may output a data signal DS corresponding to image data to the display panel DP. Also, the driver DRV may output a driving signal for the sensor pixels SPXL, and receive electrical signals (e.g., a sensing signal SS) received from the sensor pixels SPXL. The driver DRV may detect a fingerprint shape of a user by using the received electrical signals.

In some exemplary embodiments, the driver DRV may include the panel driver DRV_DP and the fingerprint detector DRV_FP. Each of the panel driver DRV_DP and the fingerprint detector DRV_FP may be implemented as an integrated circuit, and be mounted on a flexible circuit board. The panel driver DRV_DP may be connected to the display panel DP through the flexible circuit board, and the fingerprint detector DRV_FP may be connected to the sensor pixels SPXL. Although a case where the panel driver DRV_DP and the fingerprint detector DRV_FP are separated from each other is illustrated in FIGS. 1A and 1B, exemplary embodiments are not limited thereto. For example, at least a portion of the fingerprint detector DRV_FP may be integrated together with the panel driver DRV_DP, or operate in connection with the panel driver DRV_DP.

The panel driver DRV_DP may supply a data signal DS corresponding to image data to the pixels PXL while sequentially scanning the pixels PXL of the display area AA. Then, the display panel DP may display an image corresponding to the image data.

In an exemplary embodiment, the panel driver DRV_DP may supply a driving signal for a fingerprint sensing operation to the pixels PXL. The driving signal may be provided to the pixels PXL such that the pixels PXL emit light according to the driving signal and operate as a light source for the sensor pixels SPXL. Therefore, the driving signal for a fingerprint sensing operation may be provided to pixels PXL disposed in a specific area of the display panel DP (e.g., pixels PXL disposed in the fingerprint sensing area FSA).

The fingerprint detector DRV_FP may detect or recognize a fingerprint based on a sensing signal SS transferred from the sensor pixels SPXL. For example, the fingerprint detector DRV_FP may convert the sensing signal SS into a fingerprint image (e.g., image data), and perform fingerprint authentication based on the fingerprint image. The sensor pixels SPXL and the fingerprint detector DRV_FP may constitute a fingerprint authentication device FDD (e.g., a fingerprint sensing device).

In some exemplary embodiments, the fingerprint detector DRV_FP may generate or update a template based on a fingerprint image (i.e., a fingerprint image generated through a sensing operation of the sensor pixels SPXL), in a fingerprint enrollment period (e.g., a first period). The template may include at least one fingerprint image which is used as a reference (e.g., a comparison reference) in fingerprint authentication, or include information of feature points extracted from at least one fingerprint image. The template will be described with reference to FIG. 7.

In some exemplary embodiments, the fingerprint detector DRV_FP may perform fingerprint authentication by comparing a fingerprint image acquired during a fingerprint authentication period (e.g., a second period) through a sensing operation of the sensor pixels SPXL with the template. Hereinafter, the fingerprint image acquired during the fingerprint authentication period is referred to as a "sensed fingerprint image". The fingerprint authentication will be described with reference to FIG. 5.

In some exemplary embodiments, the fingerprint detector DRV_FP may set an image conversion model through learning (e.g., machine learning operations) on various fingerprint images provided from the outside and/or on fingerprint images acquired in the fingerprint authentication period. Further, the fingerprint detector DRV_FP may generate a pseudo image by converting or processing an image enrolled or stored by using the image conversion model (e.g., a fingerprint image added to the template in the fingerprint enrollment period), and add the pseudo image to the template. The various fingerprint images may include a high-quality fingerprint image and a low-quality fingerprint image of each of various objects (e.g., users), and the image conversion model may be a conversion algorithm (e.g., a function) between the high-quality fingerprint image and the low-quality fingerprint image. The quality of a fingerprint image may be determined by a luminance difference between a ridge and a valley in the fingerprint image, or by a signal-to-noise ratio of the fingerprint image. The high quality may mean a case where the signal-to-noise ratio is greater than or equal to a reference signal-to-noise ratio, and the low quality may mean a case where the luminance difference is smaller than a reference luminance difference or a case where the signal-to-noise ratio is smaller than the reference signal-to-noise ratio. As the image enrolled or stored by using the image conversion model is converted into the pseudo image, a quality of the pseudo image may be lower than that of the enrolled image.

A case where the fingerprint detector DRV_FP sets an image conversion model through learning (e.g., machine learning operations) and generates a pseudo image by using the image conversion model will be described later with reference FIGS. 8 and 9.

The quality of a sensed fingerprint image may be lowered or deteriorated according to a state of skin (e.g., when the skin is dry or when the skin is wrinkled or contracted) or an authentication environment such as fingerprint sensing environment (e.g., when surroundings are very bright or dark). When fingerprint authentication is performed by using a template including only a fingerprint image enrolled or stored in the fingerprint enrollment period, a similarity (e.g., an accordance rate) between a relatively low-quality sensed fingerprint image and a relatively high-quality enrolled fingerprint image is low. Therefore, the accuracy of fingerprint recognition may be lowered, and the fingerprint authentication may not be successfully performed. In particular, the fingerprint authentication may not be successfully performed for a long time, until before the state of skin is recovered to a normal state or before the authentication environment is changed to a general authentication environment.

Therefore, the fingerprint detector DRV_FP may set an image conversion model through learning, generate a low-quality pseudo image by processing a fingerprint image enrolled or stored using an image conversion model, and perform fingerprint authentication by using a template including the pseudo image. Thus, although the quality of a sensed fingerprint image is lowered or deteriorated when the state of skin of a user or an authentication environment is not normal, a similarity between the low-quality sensed fingerprint image and the low-quality pseudo image is high. Accordingly, the accuracy of fingerprint recognition is be improved.

In addition, the fingerprint detector DRV_FP does not only add the low-quality sensed fingerprint image to the template, but may convert the enrolled fingerprint image into the pseudo image by using the image conversion model such that the converted pseudo image (e.g., a new fingerprint image for authentication) reflects or includes various conditions (e.g., a state of skin and authentication environment). Thus, a fingerprint may be accurately recognized in additional states of skin of a user and/or in an unexpected authentication environment, which are not considered in fingerprint enrollment.

Figure 2A:
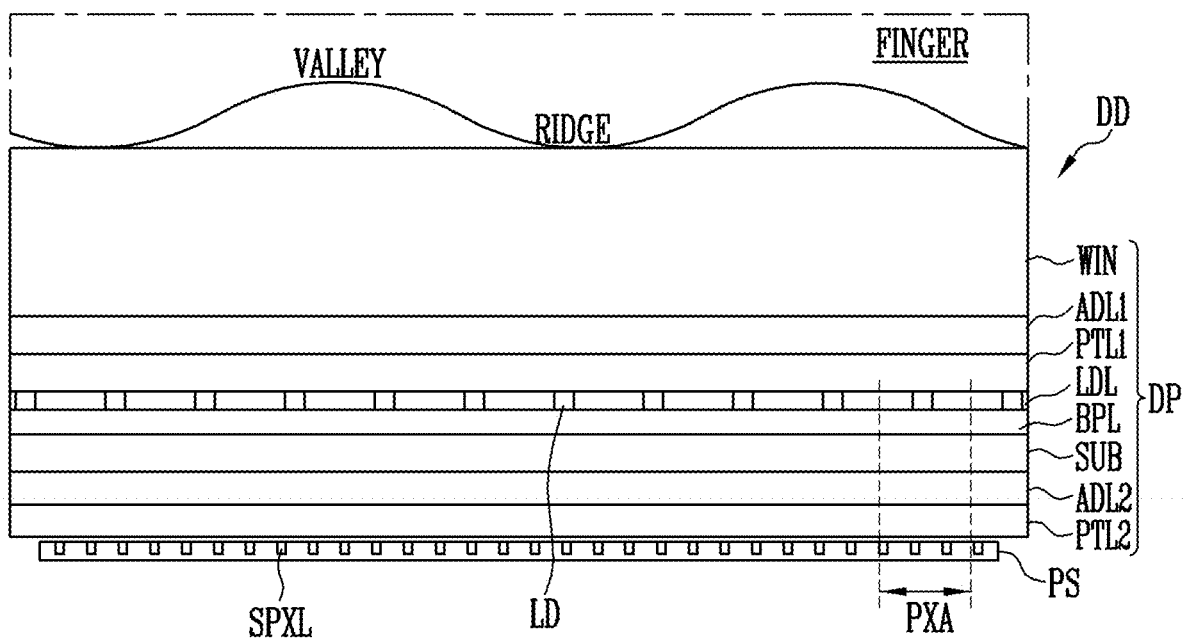
FIG. 2A is a sectional view illustrating an example of the display device of FIG. 1A.

FIG. 2A is a sectional view illustrating an example of the display device shown in FIG. 1A. A section of the display device DD shown in FIGS. 1A and 1B in the fingerprint sensing area FSA is illustrated in FIG. 2A.

Referring to FIGS. 1A, 1B, and 2A, the display device DD may include the display panel DP and a sensor PS (e.g., a fingerprint sensor) disposed on a lower surface of the display panel DP in the fingerprint sensing area FSA. Also, the display device DD may include a substrate SUB, and a circuit element layer BPL, a light emitting device layer LDL, a first protective layer PTL1, a first adhesive layer ADL1, and a window WIN, which are sequentially stacked or disposed on an upper surface of the substrate SUB. Also, the display device DD may include a second adhesive layer ADL2 and a second protective layer PTL2, which are sequentially stacked or disposed on a lower surface of the substrate SUB in the fingerprint sensing area FSA.

The substrate SUB is a base substrate of the display panel DP, and may be substantially transparent. For example, the substrate SUB may be a transparent transmissive substrate. The substrate SUB may be a rigid substrate such as glass or tempered glass, or a flexible substrate formed of plastic. However, exemplary embodiments are not limited thereto, and the substrate SUB may be made of various materials.

The circuit element layer BPL may be disposed on the upper surface of the substrate SUB, and include at least one conductive layer. For example, the circuit element layer BPL may include a plurality of circuit elements constituting pixel circuits of the pixels PXL and lines for supplying various power sources and signals for driving the pixels PXL. The circuit element layer BPL may include various types of circuit elements such as at least one transistor and at least one capacitor, and a plurality of conductive layers for constituting lines connected to the circuit elements. Also, the circuit element layer BPL may include at least one insulating layer disposed between the plurality of conductive layers.

The light emitting device layer LDL may be disposed on an upper surface of the circuit element layer BPL. The light emitting device layer LDL may include a plurality of light emitting devices LD connected to the circuit elements and/or the lines of the circuit element layer BPL through contact holes, etc.

In an exemplary embodiment, at least one of the plurality of light emitting devices LD may be included in each pixel PXL. For example, the light emitting device LD may be configured as an organic light emitting diode or an inorganic light emitting diode such as a micro light emitting diode or a quantum dot light emitting diode. Also, the light emitting device LD may be a light emitting device formed of a combination of an organic material and an inorganic material. Further, each of the pixels PXL includes a single light emitting device LD. Alternatively, in another exemplary embodiment, each of the pixels PX may include a plurality of light emitting devices, and the plurality of light emitting devices may be coupled to each other in parallel, be coupled to each other in series, or be coupled to each other in series/parallel.

The first protective layer PTL1 may be disposed on the top of the light emitting device layer LDL to cover the display area AA. The first protective layer PTL1 may include an encapsulating member such as a thin film encapsulation (TFE) layer or an encapsulation substrate, and additionally include a protective film, and the like in addition to the encapsulating member.

The first adhesive layer ADL1 is disposed between the first protective layer PTL1 and the window WIN to couple the first protective layer PTL1 and the window WIN to each other. The first adhesive layer ADL1 may include a transparent adhesive such as an optically clear adhesive (OCA), and include various adhesive materials in addition to the transparent adhesive.

The window WIN is a protective member disposed at an uppermost portion of the display device DD including the display panel DP, and may be substantially transparent. For example, the window WIN may be a transparent transmissive substrate. The window WIN may have a multi-layered structure including a glass substrate, a plastic film, and/or a plastic substrate. The window WIN may include a rigid or flexible substrate, and the material constituting the window WIN may be varied or changed.

In various exemplary embodiments, the display device DD may further include a polarizing plate, an anti-reflective layer, and/or a touch sensor layer (e.g., touch electrode layer). For example, the display device DD may further include a polarizing plate and/or a touch sensor layer, disposed between the first protective layer PTL1 and the window WIN.

The second protective layer PTL2 may be disposed on the lower surface of the substrate SUB. The second protective layer PTL2 may be coupled to the substrate SUB by the second adhesive layer ADL2. The second adhesive layer ADL2 may include a transparent adhesive such as an OCA. The second adhesive layer ADL2 may include a pressure sensitive adhesive (PSA), which acts as an adhesive material when pressure is applied to an adhesive surface of the second adhesive layer ADL2.

The second protective layer PTL2 prevents oxygen and moisture from being introduced thereto from the outside, and may be in the form of a single layer or multi-layer. The second protective layer PTL2 may be configured in a film form, to further provide flexibility of the display panel DP. The second protective layer PTL2 may be coupled to the sensor PS through another adhesive layer including a transparent adhesive material such as an OCA.

In various exemplary embodiments, when the sensor PS includes a photo sensor, a selective light blocking film may be further provided on the bottom of the second protective layer PTL2. The selective light blocking film blocks light in a specific frequency region, e.g., ultraviolet light in external light introduced to the display device DD, to prevent the corresponding light from being incident into sensor pixels SPXL of the sensor PS.

The sensor PS is attached to the lower surface (e.g., the rear surface) of the display panel DP through an adhesive or the like to overlap at least one area of the display panel DP. For example, the sensor PS may be disposed to overlap the display panel DP in the fingerprint sensing area FSA. The sensor PS may include a plurality of sensor pixels SPXL arranged or dispersed at a predetermined resolution and/or a predetermined distance.

In an exemplary embodiment, when the sensor PS includes a photo sensor, an optical system which provides a light path by concentrating lights transmitting toward the sensor PS may be provided on the sensor PS. In the optical system, a width of a light transmitting part for guiding light may be determined by considering about sensing accuracy and light conversion efficiency. The concentration ratio of lights incident into the sensor PS may be improved by the optical system. In some exemplary embodiments, the optical system may be formed of optical fiber, silicon, etc.

The sensor pixels SPXL may have an appropriate number, an appropriate size, and an appropriate arrangement such that a fingerprint image to be identifiable from electrical signals output by the sensor pixels SPXL may be generated. The distance between the sensor pixels SPXL may be densely set such that reflected light reflected from an object to be observed (e.g., a fingerprint or the like) may be incident into at least two adjacent sensor pixels SPXL.

Figure 2B:
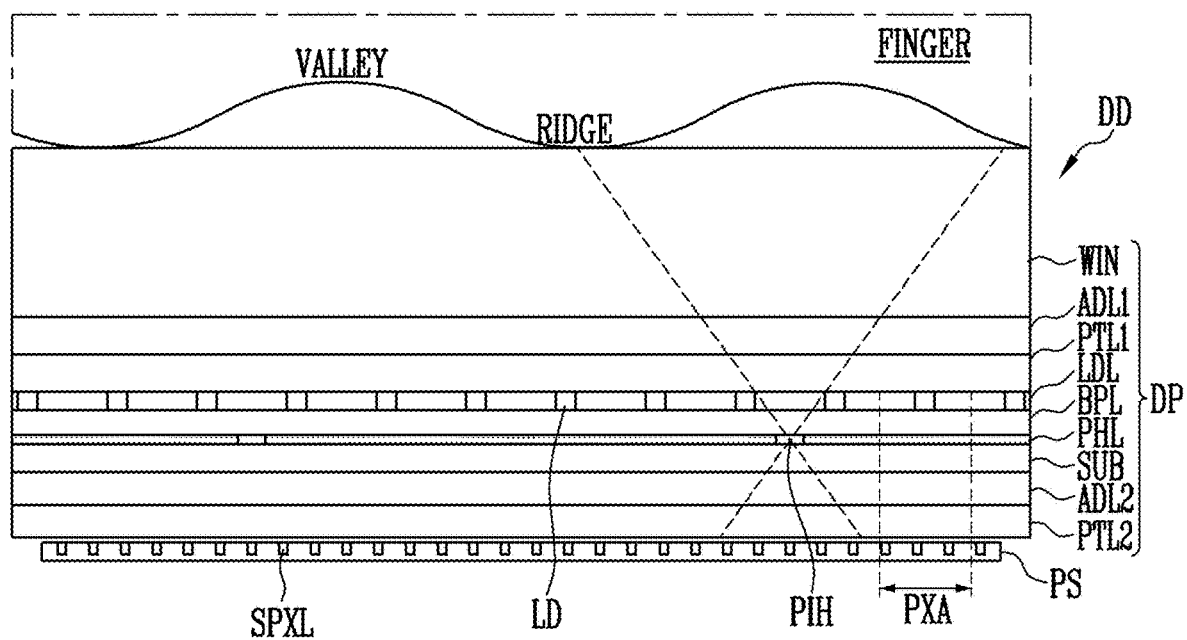
FIG. 2B is a sectional view illustrating another example of the display device of FIG. 1A.

FIG. 2B is a sectional view illustrating another example of the display device shown in FIG. 1A.

Referring to FIGS. 1A, 1B, 2A, and 2B, the display device DD may further include a light blocking layer PHL including pin holes PIH. The light blocking layer PHL may be disposed in the display panel DP or between the display panel DP and the sensor pixels SPXL, to block some of lights incident into the sensor pixels SPXL. For example, some of lights incident into the light blocking layer PHL may be blocked, and the others may reach the sensor pixels SPXL under the light blocking layer PHL by passing through the pin holes PIH.

Each of the pin holes PIH may include an optical hole, and be a kind of light passing hole. For example, the pin hole PIH may be a light passing hole having the smallest size (e.g., area) among light passing holes disposed when layers of the display device DD overlap each other, on a path along which reflected light passes through the display panel DP in an oblique direction or vertical direction and then is incident into the sensor pixels SPXL.

The pin holes PIH may have a predetermined width (e.g., diameter), e.g., a width (e.g., diameter) in a range of 5 µm to 20 µm. In this manner, the width of an optical opening area, which is to be required or secured in each layer of the display device DD, may be gradually increased as each pin hole PIH becomes more distant from the light blocking layer PHL (e.g., as the pin hole PIH approaches in upper and lower directions).

Only reflected lights passing through the pin holes PIH may reach the sensor pixels SPXL. A phase of light reflected from a fingerprint and a phase of an image formed in the photo sensor PS may have a phase difference of 180 degrees due to the pin hole PIH having a very narrow width.

The sensor pixels SPXL may output a sensing signal SS, e.g., a voltage signal corresponding to the reflected light received by the sensor pixels SPXL.

However, this is exemplary illustrated, and the configuration, arrangement, driving method, etc. of a photo sensor for detecting light reflected from a fingerprint are not limited to the sensor PS shown in FIG. 2B.

For example, although a pin hole-type photo sensor has been illustrated in FIG. 2B, exemplary embodiments are not limited thereto. For example, a micro lens-type photo sensor or a collimator-type photo sensor may be used.

Figure 2C:
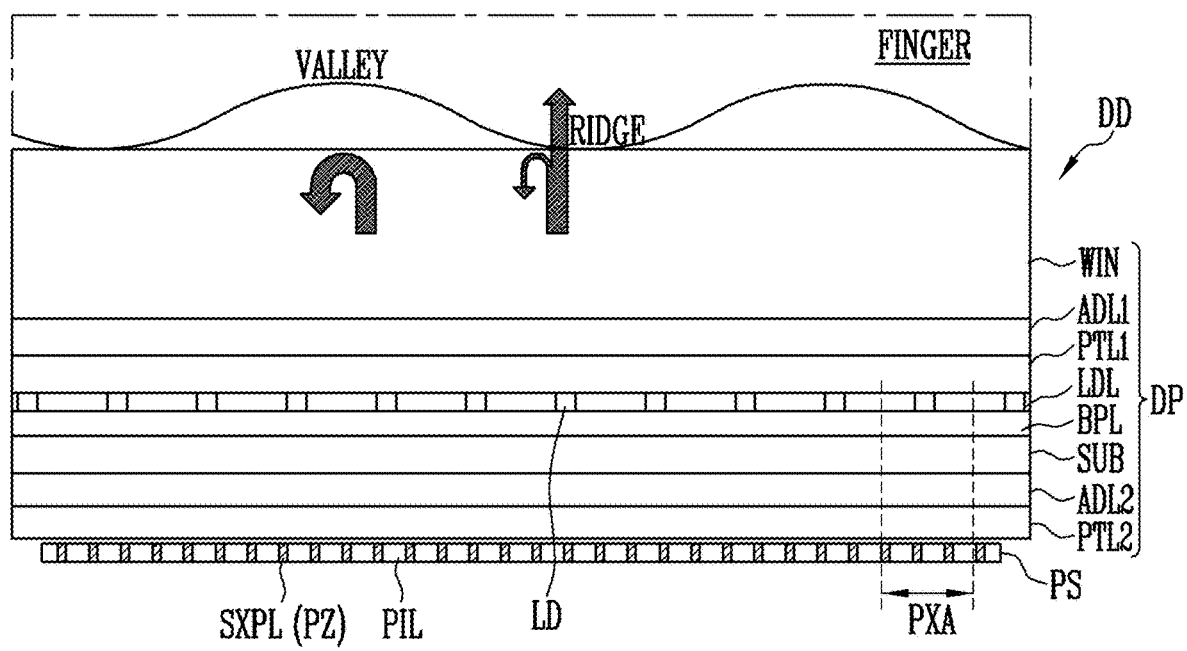
FIG. 2C is a sectional view illustrating still another example of the display device of FIG. 1A.

FIG. 2C is a sectional view illustrating still another example of the display device shown in FIG. 1A.

Referring to FIGS. 1A to 2A and 2C, the sensor PS may include an ultrasonic sensor. The sensor pixels SPXL (see FIG. 2A) may be implemented with a piezoelectric element PZ. A filler PIL for insulating vibrations between the piezoelectric elements PZ may be filled between the piezoelectric elements PZ.

Each of the piezoelectric elements PZ may include a vibrator and electrodes disposed on a top surface and a bottom surface of the vibrator. The vibrator may include a material such as titanate zirconate lead (PZT), which is easily vibrated.

When an AC voltage having a specific frequency is applied to the electrodes of the piezoelectric elements PZ, an ultrasonic wave having a specific frequency (e.g., 12 MHz) may be emitted while the vibrator is being vertically vibrated.

At a valley portion of a fingerprint, the most of ultrasonic waves do not pass the window WIN, because the most of ultrasonic waves are reflected due to a medium difference between the window WIN and air. On the other hand, at a ridge portion of the fingerprint, which is in contact with the window WIN, some of the ultrasonic waves may pass through the window WIN, and only the other of the ultrasonic waves may be reflected toward the sensor PS. For example, the intensity of the ultrasonic wave incident into each of the sensor pixels SPXL may be changed according to whether the ultrasonic wave is caused or reflected by a valley or a ridge of the fingerprint. Thus, the sensor pixels SPXL may output a sensing signal SS having different electrical characteristics, corresponding to the intensity of the ultrasonic wave.

Figure 3:
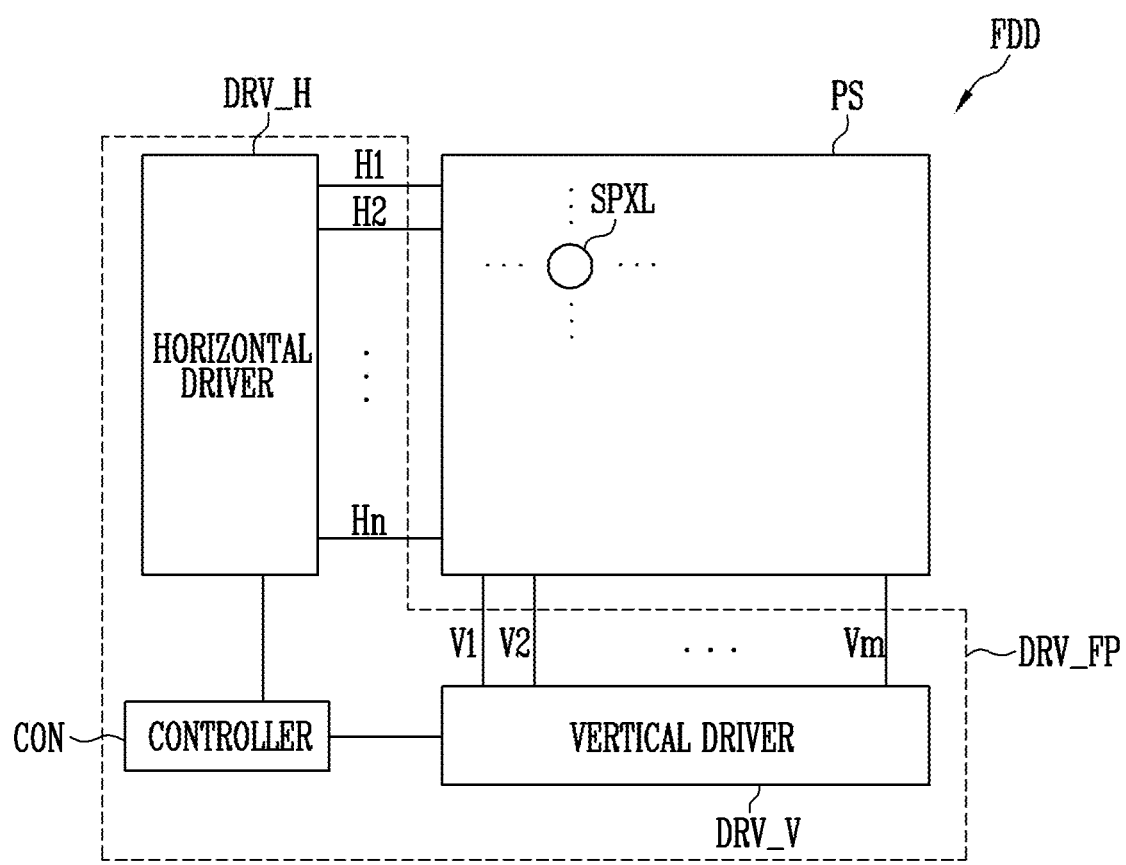
FIG. 3 is a block diagram illustrating an example of a fingerprint authentication device included in the display device of FIG. 1A.

FIG. 3 is a block diagram illustrating an example of the fingerprint authentication device included in the display device of FIG. 1A. Hereinafter, a case where a sensor PS is a photo sensor is exemplarily described.

Referring to FIGS. 1A, 2A, and 3, the fingerprint authentication device FDD may include the sensor PS and a fingerprint detector DRV_FP.

The sensor PS may include an array of sensor pixels SPXL. In an exemplary embodiment, the sensor pixels SPXL may be arranged in a two-dimensional array, but exemplary embodiments are not limited thereto. Each of the sensor pixels SPXL may include a photoelectric device which converts incident light into electric charges according to an amount of the light.

The fingerprint detector DRV_FP may include a horizontal driver DRV_H, a vertical driver DRV_V, and a controller CON.

The horizontal driver DRV_H may be connected to the sensor pixels SPXL through driving lines HI to Hn. The horizontal driver DRV_H may be configured as a shift register, an address decoder, or the like. In various exemplary embodiments, the horizontal driver DRV_H may apply a driving signal to drive selected sensor pixels SPXL among the sensor pixels SPXL. For example, the horizontal driver DRV_H may apply a driving signal in a unit of a sensor pixel row.

The sensor pixels SPXL selected and driven by the horizontal driver DRV_H sense light by using photoelectric devices provided therein, and output an electrical signal (e.g., sensing signal SS), as a voltage signal in an analog form, which corresponds to the sensed light.

The vertical driver DRV_V may be connected to the sensor pixels SPXL through signal lines V1 to Vm. The vertical driver DRV_V may perform processing on an electrical signal output from the sensor pixels SPXL.

For example, the vertical driver DRV_V may perform Correlated Double Sampling (CDS) processing for removing noise from an electrical signal. Also, the vertical driver DRV_V may convert an analog signal received from the sensor pixel SPXL into a digital signal. In an exemplary embodiment, an analog-digital converter may be provided for each sensor pixel column, to process in parallel analog signals received from the sensor pixel columns.

The controller CON may control the horizontal driver DRV_H and a vertical driver DRV_V.

In an exemplary embodiment, the controller CON may generate image data (e.g., fingerprint data) corresponding to the sensing signal SS received from the vertical driver DRV_V, and, perform processing on the image data. Also, in an exemplary embodiment, the controller CON may detect a fingerprint from the processed image data, and authenticate the detected fingerprint or transmit the detected fingerprint to the outside. However, this is exemplary illustrated, and generation of image data and fingerprint detection are not performed by the controller CON, but may be performed by an external host processor, etc.

Figure 4:
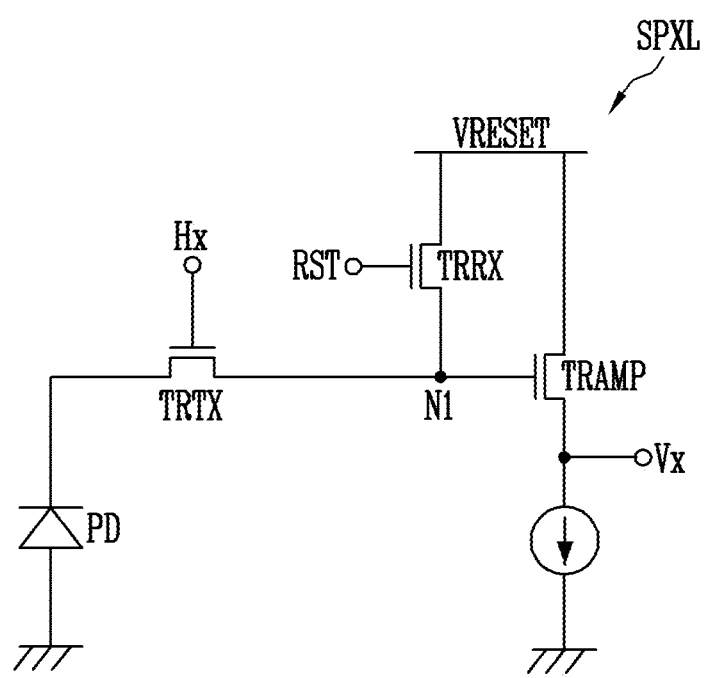
FIG. 4 is a circuit diagram illustrating an example of a sensor pixel included in the fingerprint authentication device of FIG. 3.

FIG. 4 is a circuit diagram illustrating an example of the sensor pixel included in the fingerprint authentication device of FIG. 3. In FIG. 4, a sensor pixel SPXL disposed on an x-th ('x' is a natural number) sensor pixel row and an x-th sensor pixel column is illustrated.

Referring to FIGS. 3 and 4, the sensor pixel SPXL includes a photo diode PD (as an example of the photoelectric device), a transmission transistor TRTX, a reset transistor TRRX, and an amplification transistor TRAMP. In FIG. 4, an example in which the transistors are implemented with an N-type transistor is illustrated. However, in various exemplary embodiments, at least some of the transistors may be implemented with a P-type transistor, and corresponding to this, the circuit structure of the sensor pixel SPXL may be variously modified.

An anode electrode of the photo diode PD is grounded. The transmission transistor TRTX is connected between a cathode electrode of the photo diode PD and a first node N1. A gate electrode of the transmission transistor TRTX is connected to a driving line Hx. The transmission transistor TRTX is turned on when a driving signal is applied through the driving line Hx from the horizontal driver DRV_H. When the transmission transistor TRTX is turned on, electric charges, which are generated by photoelectric-converting in the photo diode PD, may be transferred to the first node N1.

The reset transistor TRRX is connected between a reset power source VRESET and the first node N1, and may receive a reset signal applied through a gate electrode connected to a reset line RST. The reset transistor TRRX is turned on when the reset signal is applied. When the reset transistor TRRX is turned on, a voltage of the first node N1 may be reset as a voltage of the reset power source VRESET.

The amplification transistor TRAMP is connected between the reset power source VRESET and a signal line Vx. A gate electrode of the amplification transistor TRAMP is connected to the first node N1. The amplification transistor TRAMP operates as an amplifier which outputs a signal corresponding to the voltage of the first node N1 to the signal line Vx.

In various exemplary embodiments, the structure of the sensor pixel SPXL is not limited to that described above, and the sensor pixel SPXL may include, for example, four or more transistors or two or less transistors.

Figure 5:
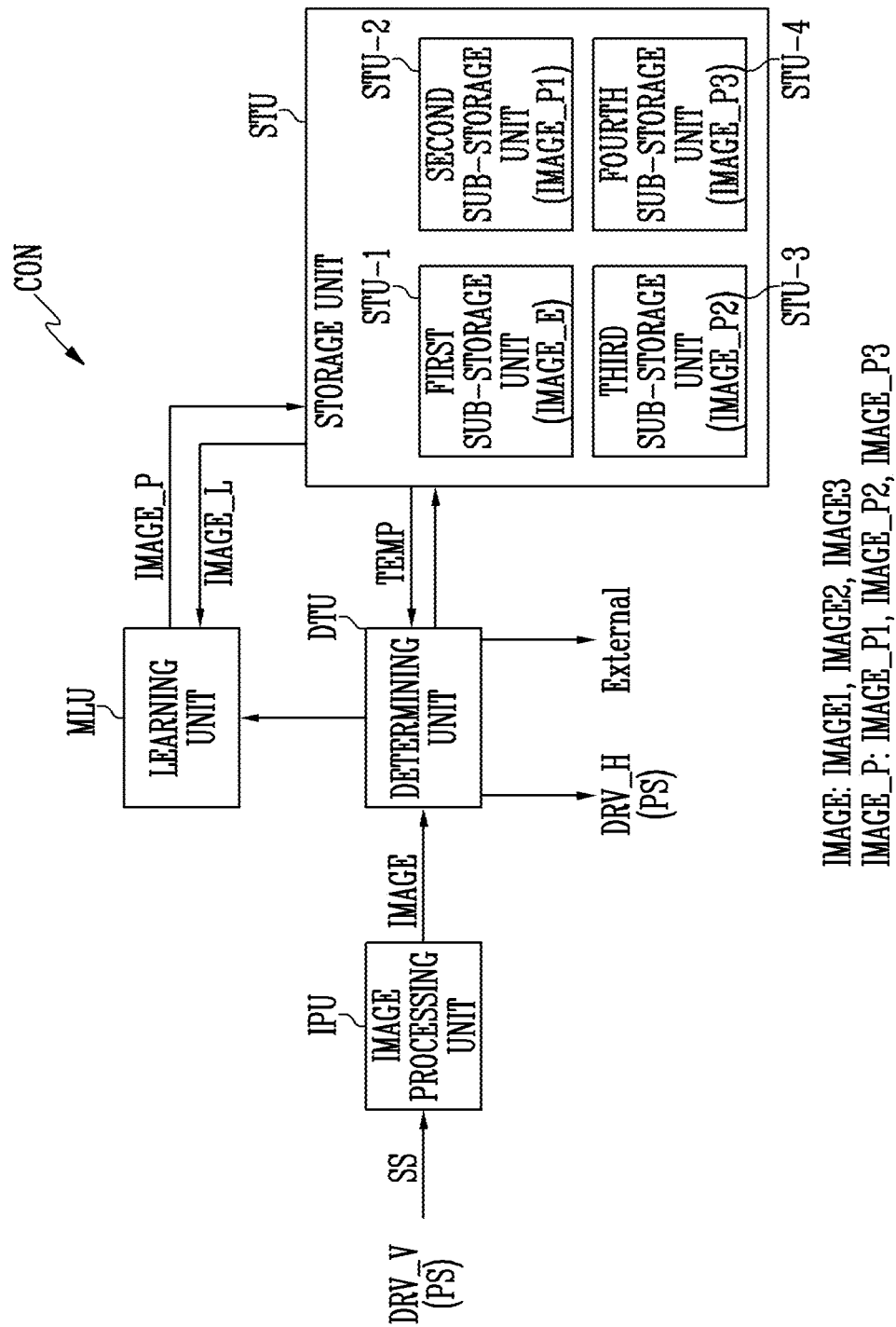
FIG. 5 is a block diagram illustrating an example of a controller of FIG. 3.
Figure 6:
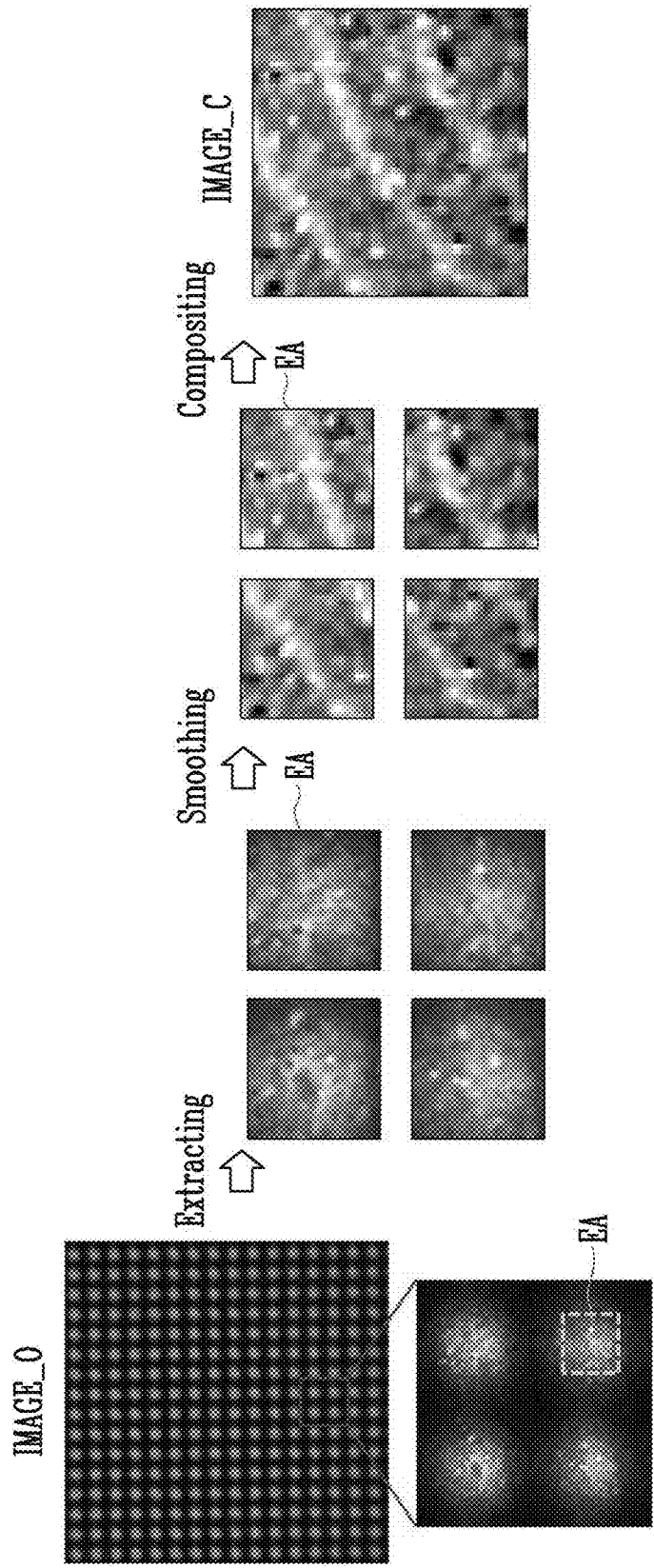
FIG. 6 is a diagram illustrating an operation of an image processing unit included in the controller of FIG. 5.

FIG. 5 is a block diagram illustrating an example of the controller of FIG. 3. FIG. 6 is a diagram illustrating an operation of an image processing unit included in the controller of FIG. 5. FIG. 7 is a diagram illustrating a template used in the controller of FIG. 5. FIGS. 8 and 9 are diagrams illustrating an operation of a learning unit included in the controller of FIG. 5. FIG. 10 is a diagram illustrating fingerprint images used for real-time learning of the controller of FIG. 5.

Referring to FIGS. 3 and 5, the controller CON may include an image processing unit IPU, a determining unit DTU, a learning unit MLU, and a storage unit STU.

The image processing unit IPU may generate a fingerprint image IMAGE based on a sensing signal SS provided from the vertical driver DRV_V (or the sensor PS).

Referring to FIG. 6, the image processing unit IPU may convert the sensing signal SS into an original image IMAGE_O. The original image IMAGE_O may be expressed as a grid pattern through light path formation caused by the pin holes PIH (see FIG. 2B).

In an exemplary embodiment, the image processing unit IPU may extract effective areas EA from the original image IMAGE_O as shown in FIG. 6. The effective area EA may mean or correspond to an area in which reflective light is received through one pin hole PIH (see FIG. 2B), in the original image IMAGE_O.

In an exemplary embodiment, the image processing unit IPU may perform image processing on the original image IMAGE_O or on the effective areas EA extracted from the original image IMAGE_O.

For example, the image processing unit IPU may perform a smoothing operation on the effective areas EA. The image processing unit IPU may increase light and shade distinction of the effective areas EA, and remove noise, etc. from the effective areas EA. The smoothing operation may be performed through histogram analysis of each pixel in the original image. For example, a median filter may be used for the smoothing operation. The smoothing operation may be performed by various algorithms known in the art, but exemplary embodiments are not limited thereto.

For example, the image processing unit IPU may perform a binarization operation and a thinning operation on the original image IMAGE_O or on the effective areas EA extracted from the original image IMAGE_O. The image processing unit IPU may convert a plurality of gray levels (e.g., 256 gray levels) into a value corresponding to 0 (e.g., corresponding to a black color) or 1 (e.g., corresponding to a white color). Then, a ridge and a valley, which constitute a fingerprint, may be clearly distinct as black and white, respectively. Also, the image processing unit IPU may generate a line image, in which the width of the ridge is 1 pixel, from the binarized image. The binarization operation and the thinning operation are performed to improve the accuracy of fingerprint detection. However, the binarization operation and the thinning operation may be omitted when the binarization operation and the thinning operation are not required.

In an exemplary embodiment, at least one of the above-described image processing operations may be omitted, or a larger number of image processing operations may be performed, if necessary. For example, when the original image is a sufficiently satisfactory image having low noise, the smoothing operation may not be performed.

When the effective areas EA are extracted, the image processing unit IPU may generate one synthetic image IMAGE_C (e.g., synthetic data or synthetic image data) by synthesizing image-processed effective areas EA. For example, the image processing unit IPU may generate one synthetic image IMAGE_C by successively or continuously connecting the extracted effective areas EA.

A process in which the display device DD generates a fingerprint image IMAGE from a sensing signal SS corresponding to reflected light transmitted through the pin holes PIH is described in FIG. 6, but exemplary embodiments are not limited thereto. When the display device DD senses a fingerprint by using another method (e.g., when the display device DD acquires a sensing signal SS through an ultrasonic sensor), the fingerprint image IMAGE may be generated by using various image processing techniques.

Hereinafter, for convenience of description, a fingerprint image (e.g., a synthetic image IMAGE_C) generated by the image processing unit IPU to perform fingerprint enrollment or initial generation/storage of a template TEMP in the fingerprint enrollment period is defined as a first fingerprint image IMAGE1, and a fingerprint image generated by the image processing unit IPU to perform fingerprint authentication in the fingerprint authentication period is defined as a second fingerprint image IMAGE2. The second fingerprint image IMAGE2 may be used for fingerprint authentication. A low-quality fingerprint image generated by the image processing unit IPU by changing a driving condition of the sensor PS with respect to a substantially identical object at a substantially identical time together with the second fingerprint image IMAGE2 in the fingerprint authentication period is defined as a third fingerprint image IMAGE3. For example, the third fingerprint image IMAGE3 may be obtained from the substantially identical object (which is used to obtain the first fingerprint image IMAGE1) during the fingerprint authentication period by using the driving condition of the sensor PS different from the driving condition of the sensor PS, which is used to obtain the first fingerprint image IMAGE1. The third fingerprint image IMAGE3 is not used for fingerprint authentication, and may be used for learning using an artificial intelligence (AI) technique which will be described later.

Referring back to FIG. 5, in the fingerprint enrollment period, the determining unit DTU may determine a quality of the first fingerprint image IMAGE1 provided from the image processing unit IPU. The determining unit DTU may determine whether the first fingerprint image IMAGE1 is added to or included in a template TEMP according to the determined quality of the first fingerprint as a quality determination result. The template TEMP may be stored in the storage unit STU, and include a plurality of fingerprint images or include information of feature points extracted from each of the plurality of fingerprint images. For convenience of description, a case where the template TEMP includes a plurality of fingerprint images is described below.

Referring to FIG. 7, the template TEMP may include a plurality of fingerprint images which may be acquired at several positions of one finger. For example, as shown in FIG. 7, fingerprint images IMAGE_E1, IMAGE_E2, . . . , and IMAGE_Ek (e.g., 'k' is 12) may be classified into a plurality of groups according to a position at the finger (e.g., according to a position of a portion of the finger in contact, at a time, with the window WIN described with reference to FIG. 3 according to a posture of the finger). For example, the fingerprint images IMAGE_E1, IMAGE_E2, . . . , and IMAGE_Ek included in the template TEMP may overlap each other in at least a partial area. In another example, the fingerprint images IMAGE_E1, IMAGE_E2, . . . , and IMAGE_Ek included in the template TEMP may not overlap each other. Hereinafter, for convenience of description, the fingerprint images IMAGE_E1, IMAGE_E2, . . . , and IMAGE_Ek acquired in the fingerprint enrollment period to be added to the template TEMP, which includes fingerprint images enrolled by a user, are referred to as enrolled images IMAGE_E.

Referring back to FIG. 5, when the quality of the first fingerprint image IMAGE1 is higher than or equal to a reference quality (or quality value), the determining unit DTU may generate the template TEMP based on the first fingerprint image IMAGE1. For example, when the quality of the first fingerprint image IMAGE1 is higher than or equal to the reference quality (or quality value), the determining unit DTU may generate or update an enrolled image IMAGE_E (e.g., a first enrolled image IMAGE_E1) including at least a portion of the first fingerprint image IMAGE1, and generate the template TEMP including the enrolled image IMAGE_E.

When the quality of the first fingerprint image IMAGE1 is lower than the reference quality, the determining unit DTU may re-acquire a first fingerprint image IMAGE1 through the sensor PS and the image processing unit IPU, and again determine a quality of the re-acquired first fingerprint image IMAGE1. When the quality of the re-acquired first fingerprint image IMAGE1 is higher than or equal to the reference quality (e.g., quality value), the determining unit DTU may generate the template TEMP based on the re-acquired first fingerprint image IMAGE1, e.g., by adding the re-acquired first fingerprint image IMAGE1 to the template TEMP.

The determining unit DTU may generate the template TEMP including the plurality of fingerprint images IMAGE_E1, IMAGE_E2, . . . , and IMAGE_Ek shown in FIG. 7 by determining qualities of a plurality of first fingerprint images IMAGE1, which are acquired in the fingerprint enrollment period or acquired for each position at the finger.

In the fingerprint authentication period, the determining unit DTU may compare the second fingerprint image IMAGE2 provided from the image processing unit IPU with the template TEMP (e.g., fingerprint images included in the template TEMP or the enrolled image IMAGE_E).

In an exemplary embodiment, the determining unit DTU may extract first feature points from the second fingerprint image IMAGE2, and compare the first feature points with second feature points of each of the fingerprint images (e.g., the enrolled image IMAGE_E) in the template TEMP. Each of the first feature points and the second feature points may be a point at which a ridge of the fingerprint is ended and/or a point at which the ridge branches off. The determining unit DTU may calculate an accordance rate (e.g., a matching score) between the first feature points and the second feature points. The determining unit DTU may authenticate the second fingerprint image IMAGE2 based on the accordance rate. For example, the determining unit DTU may authenticate that a user of the second fingerprint image IMAGE2 is an enrolled user. The determining unit DTU may provide a comparison result (e.g., an authentication result) to an external device External (e.g., a host processor or an application processor).

In some exemplary embodiments, the determining unit DTU may generate a driving control signal by changing a driving condition of the sensor PS.

For example, when the sensor PS is implemented as a photo sensor and includes the sensor pixel SPXL described with reference to FIG. 4, the determining unit DTU may generate a driving control signal for decreasing a pulse width of the driving signal applied to the driving line Hx or a driving control signal for decreasing an exposure time of the sensor pixel SPXL. The driving control signal may be provided to the horizontal driver DRV_H. An example will be described with reference to FIG. 10. When the sensor PS generates a sensing signal SS with an exposure time of about 100 ms as a general driving condition, the image processing unit IPU may generate a relatively high-quality second image IMAGE2_1. When the sensor PS generates a sensing signal SS with an exposure time of about 60 ms (which is a decreased exposure time) as a low-quality driving condition in response to the driving control signal, the image processing unit IPU may generate a relatively low-quality third image IMAGE3_1. The exposure times of 100 ms and 60 ms are exemplary illustrated, and the exposure times with respect to driving conditions may be differently set according to products.

In another example, when the sensor PS is implemented as an ultrasonic sensor, the determining unit DTU may generate a driving control signal for decreasing a frequency of an ultrasonic wave emitted from the sensor PS. An example will be described with reference to FIG. 10. When the sensor PS emits an ultrasonic signal having a frequency of about 12 MHz as a general driving condition, the image processing unit IPU may generate a relatively high-quality second image IMAGE2_2. When the sensor PS emits an ultrasonic signal having a frequency of about 10 MHz (which is a decreased frequency) as a low-quality driving condition in response to the driving control signal, the image processing unit IPU may generate a relatively low-quality third image IMAGE3_2. The frequencies of 12 MHz and 10 MHz are exemplary illustrated, and the frequencies with respect to driving conditions may be differently set according to products.

In some exemplary embodiments, the third fingerprint image IMAGE3 along with the second fingerprint image IMAGE2 may be successively or sequentially generated. For example, while the finger of the user touches once the fingerprint sensing area FSA (see FIG. 1A) of the display device DD, the second fingerprint image IMAGE2 and the third fingerprint image IMAGE3 may be sequentially generated. The third fingerprint image IMAGE3 may be generated regardless of an authentication result of the second fingerprint image IMAGE2. As an authentication time of the second fingerprint image IMAGE2 is excluded, the time required from when the fingerprint of the user is input to when the third fingerprint image IMAGE3 is generated may be shortened. As described above, the second fingerprint image IMAGE2 may be used for fingerprint authentication in the determining unit DTU. As the fingerprint authentication is effectively or sufficiently performed by using the relatively high-quality second fingerprint image IMAGE2, the relatively low-quality third fingerprint image IMAGE3 may not be used for the fingerprint authentication in the determining unit DTU. When the fingerprint authentication is successfully performed with the second fingerprint image IMAGE2, the third fingerprint image IMAGE3 along with the second fingerprint image IMAGE2 may be stored in the storage unit STU to be used in the learning unit MLU which will be described later.

For example, although it has been described that the third fingerprint image IMAGE3 is generated regardless of the authentication result of the second fingerprint image IMAGE2, exemplary embodiments are not limited thereto. In some exemplary embodiments, after the fingerprint authentication is successfully performed with the second fingerprint image IMAGE2, the third fingerprint image IMAGE3 may be generated.

Figure 8:
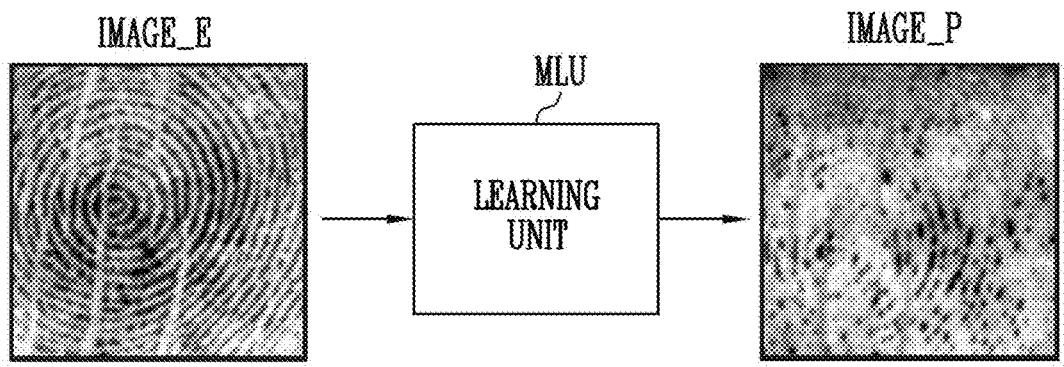
FIGS. 8 and 9 are diagrams illustrating an operation of a learning unit included in the controller of FIG. 5.

As shown in FIG. 8, the learning unit MLU may convert the enrolled image IMAGE_E (e.g., the first fingerprint image IMAGE1) included in the template TEMP into a pseudo image IMAGE_P by using an image conversion model. The image conversion model may be an algorithm for converting an image having a high quality (e.g., a large signal-to-noise ratio) into an image having a low quality (e.g., a small signal-to-noise ratio). Accordingly, a signal-to-noise ratio of the pseudo image IMAGE_P may be smaller than that of the enrolled image IMAGE_E (e.g., the first fingerprint image IMAGE1). For example, the learning unit MLU may convert a high-quality fingerprint image into a low-quality fingerprint image by using the image conversion model.

The pseudo image IMAGE_P may be added to the template TEMP. The pseudo image IMAGE_P may be used when the determining unit DTU compares the pseudo image IMAGE_P with the second fingerprint image IMAGE2 in the fingerprint authentication period.

The pseudo image IMAGE_P along with the enrolled image IMAGE_E may be included in one template TEMP, but exemplary embodiments are not limited thereto. For example, the pseudo image IMAGE_P may be included in a separate template (e.g., an auxiliary template) distinguished from the enrolled image IMAGE_E (e.g., the template TEMP).

In an exemplary embodiment, the pseudo image IMAGE_P may be managed separately from enrolled images generated in the fingerprint enrollment period or managed separately from fingerprint images directly generated from the first fingerprint image IMAGE1. For example, the enrolled images generated in the fingerprint enrollment period may be stored in a first sub-storage unit STU-1 of the storage unit STU, and the pseudo image IMAGE_P may be stored in one of a second sub-storage unit STU-2, a third sub-storage unit STU-3, and a fourth sub-storage unit STU-4.

In some exemplary embodiments, the learning unit MLU may set or update an image conversion model through learning of fingerprint images IMAGE_L for learning.

In an exemplary embodiment, the learning unit MLU may set a first image conversion model through learning of fingerprint images IMAGE_L for learning, which are provided through the storage unit STU from the outside (e.g., a database). The fingerprint images IMAGE_L for learning may include high-quality fingerprint images and low-quality fingerprint images of each of a plurality of objects (e.g., a plurality of fingerprints of users).

Figure 9:
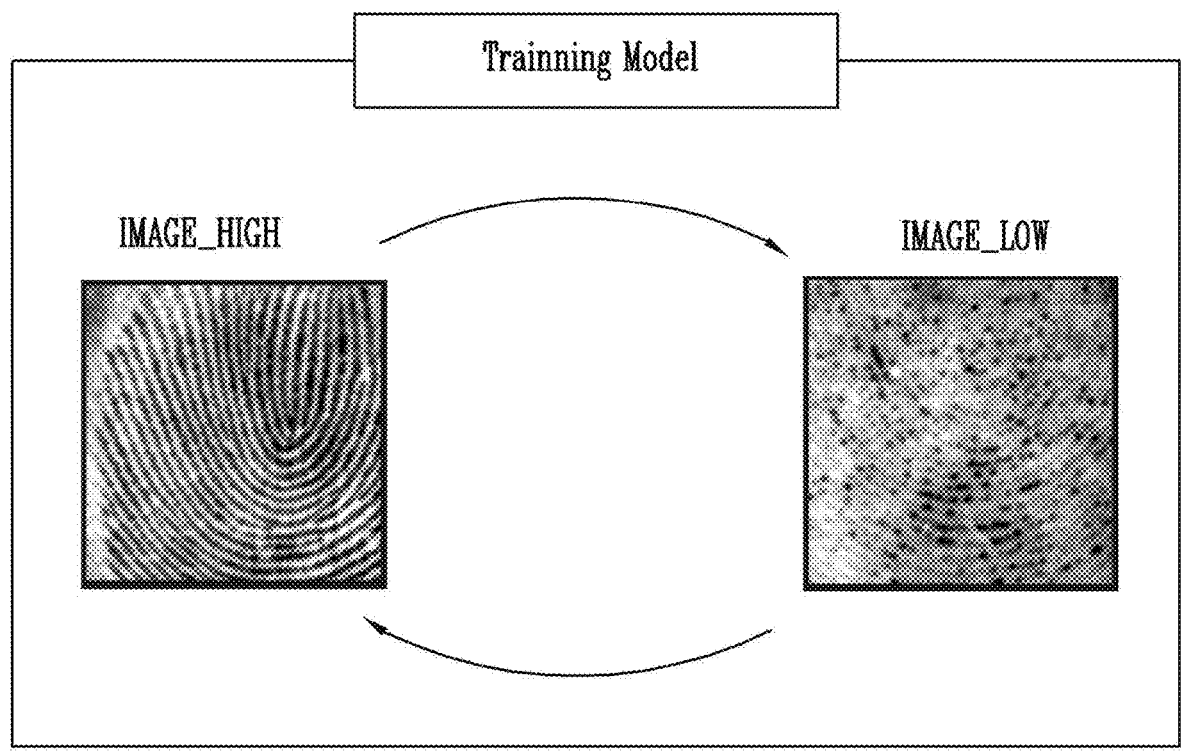

Referring to FIG. 9, the learning unit MLU may learn a pair of a high-quality fingerprint image IMAGE HIGH and a low-quality fingerprint image IMAGE LOW by using an artificial intelligence (AI) technique based on deep learning methods, and set a first image conversion model for conversion between the high-quality fingerprint image IMAGE HIGH and the low-quality fingerprint image IMAGE LOW. For example, the AI technique based on deep learning methods (e.g., learning algorithm) may include a deep belief network, an autoencoder, a convolution neural network (CNN), a recurrent neural network (RNN), a deep Q-network, and the like. However, the AI technique based on deep learning methods is exemplary illustrated, and exemplary embodiments are not limited thereto.

For example, the learning unit MLU may set a coefficient and a constant of a conversion function for converting a high-quality fingerprint image IMAGE HIGH into a low-quality fingerprint image IMAGE LOW through learning of fingerprint images IMAGE_L for learning. Also, the learning unit MLU may set a coefficient and a constant of a conversion function for converting a low-quality fingerprint image IMAGE LOW into a high-quality fingerprint image IMAGE HIGH through learning of fingerprint images IMAGE_L for learning.

The process of setting the first image conversion model through learning of the fingerprint images IMAGE_L for learning may be referred to as pre-learning.

When the first image conversion model is set through the pre-learning, the learning unit MLU may convert the enrolled image IMAGE_E (e.g., the first fingerprint image IMAGE1) included in the template TEMP into a first pseudo image IMAGE_P1 by using the first image conversion model. The first pseudo image IMAGE_P1 may be stored in the second sub-storage unit STU-2 of the storage unit STU. The first pseudo image IMAGE_P1 is not acquired through a sensing operation of the sensor PS, and is generated through conversion of the enrolled image IMAGE_E included in the template TEMP. Therefore, the first pseudo image IMAGE_P1 may include fingerprint images (e.g., 12 first pseudo images) corresponding to positions and a number of the enrolled image IMAGE_E. Also, the learning unit MLU may update the first pseudo image IMAGE_P1 through *additional* learning (e.g., learning of the fingerprint images IMAGE_L for learning).

In an exemplary embodiment, when authentication of the second fingerprint image IMAGE2 is successfully performed, the learning unit MLU may set a second image conversion model through learning of the second fingerprint image IMAGE2 and the third fingerprint image IMAGE3. Similarly to the pre-learning, the learning unit MLU may learn the high-quality second fingerprint image IMAGE2 and the low-quality third fingerprint image IMAGE3, and may set a second image conversion model for conversion between the second fingerprint image IMAGE2 and the third fingerprint image IMAGE3.

The process of setting the second image conversion model through learning of the second and third fingerprint images IMAGE2 and IMAGE3, which are actually sensed through the sensor PS and are different from the fingerprint images IMAGE_L for learning, may be referred to as real-time learning.

When the second image conversion model is set through the real-time learning, the learning unit MLU may convert the enrolled image IMAGE_E (e.g., the first fingerprint image IMAGE1) into a second pseudo image IMAGE_P2 by using the second image conversion model. The second pseudo image IMAGE_P2 may be stored in the third sub-storage unit STU-3 of the storage unit STU. Similarly to the first pseudo image IMAGE_P1, as the second pseudo image IMAGE_P2 is generated through conversion of the enrolled image IMAGE_E included in the template TEMP, the second pseudo image IMAGE_P2 may include fingerprint images (e.g., 12 second pseudo images IMAGE P2) corresponding to positions and a number of the enrolled image IMAGE_E. The second pseudo image IMAGE_P2 may be different from the third fingerprint image IMAGE3 generated through a sensing operation of the sensor PS. Also, the learning unit MLU may update the second pseudo image IMAGE_P2 through additional learning (e.g., through learning of the second fingerprint image IMAGE2 and the third fingerprint image IMAGE3, which are acquired whenever fingerprint authentication is successfully performed).

In another exemplary embodiment, when authentication on the second fingerprint image IMAGE2 is successfully performed, the learning unit MLU may update the first image conversion model through learning of the second fingerprint image IMAGE2 and the third fingerprint image IMAGE3, or set a third image conversion model.

For example, the learning unit MLU may update the first image conversion model set based on the fingerprint images IMAGE_L for learning through *additional* learning of the actually sensed second and third fingerprint images IMAGE2 and IMAGE3. The process of updating the first image conversion model through learning of the actually sensed second and third fingerprint images IMAGE2 and IMAGE3 may be referred to as complex learning.

When the first image conversion model is updated through the complex learning (e.g., when the third image conversion model is generated), the learning unit MLU may convert the enrolled image IMAGE_E (e.g., the first fingerprint image IMAGE1) into a third pseudo image IMAGE_P3 by using the updated first image conversion model. The third pseudo image IMAGE_P3 may be stored in the fourth sub-storage unit STU-4 of the storage unit STU. Similarly to the second pseudo image IMAGE_P2, as the third pseudo image IMAGE_P3 is generated through conversion of the enrolled image IMAGE_E included in the template TEMP, the third pseudo image IMAGE_P3 may include fingerprint images (e.g., 12 third pseudo images IMAGE P3) corresponding to positions and a number of the enrolled image IMAGE_E. The third pseudo image IMAGE_P3 may be different from the third fingerprint image IMAGE3 generated through a sensing operation of the sensor PS. Also, the learning unit MLU may update the third pseudo image IMAGE_P3 through additional learning (e.g., through learning of the second fingerprint image IMAGE2 and the third fingerprint image IMAGE3, which are acquired whenever fingerprint authentication succeeds).

The storage unit STU may store the template TEMP. For example, the storage unit STU may be implemented as a memory device.

In an exemplary embodiment, in the fingerprint enrollment period, the storage unit STU may add, to the template TEMP, the enrolled image IMAGE_E generated through the determining unit DTU (e.g., the fingerprint images IMAGE_E1, IMAGE_E2, . . . , and IMAGE_Ek (see FIG. 7) including at least a portion of the first fingerprint image IMAGE1).

In an exemplary embodiment, in the fingerprint authentication period, the storage unit STU may store the second fingerprint image IMAGE2 and the third fingerprint image IMAGE3, which are provided through the determining unit DTU based on the comparison result (e.g., the authentication result) of the determining unit DTU. The second fingerprint image IMAGE2 and the third fingerprint image IMAGE3 may be provided to the storage unit STU from the determining unit DTU only when authentication is successfully performed. The second fingerprint image IMAGE2 and the third fingerprint image IMAGE3 may not be added to the template TEMP, and be separately stored as data for learning of the learning unit MLU. However, exemplary embodiments are not limited thereto. For example, the enrolled image IMAGE_E may be replaced with the second fingerprint image IMAGE2. For example, the second fingerprint image IMAGE2 (or feature points included in the second fingerprint image IMAGE2 as compared with the enrolled image IMAGE_E) may be used to update the enrolled image IMAGE_E (or the template TEMP). In another example, the third fingerprint image IMAGE3 may be added to the template TEMP, and be stored in the first sub-storage unit STU-1.

In an exemplary embodiment, the storage unit STU may include the first sub-storage unit STU-1 (or a first template), the second sub-storage unit STU-2 (or a second template), the third sub-storage unit STU-3 (or a third template), and the fourth sub-storage unit STU-4 (or a fourth template). The first sub-storage unit STU-1 may store the enrolled image IMAGE_E generated in the fingerprint enrollment period, the second sub-storage unit STU-2 may store the first pseudo image IMAGE_P1 generated through the pre-learning, the third sub-storage unit STU-3 may store the second pseudo image IMAGE_P2 generated through the real-time learning, and the fourth sub-storage unit STU-4 may store the third pseudo image IMAGE_P3 generated through the complex learning.

In some exemplary embodiments, the determining unit DTU may perform authentication on the second fingerprint image IMAGE2 by using at least one of the enrolled image IMAGE_E, the first pseudo image IMAGE_P1, the second pseudo image IMAGE_P2, and the third pseudo image IMAGE_P3.

For example, the determining unit DTU may primarily perform authentication on the second fingerprint image IMAGE2 by using the enrolled image IMAGE_E, and secondarily perform authentication on the second fingerprint image IMAGE2 by using at least one of the first pseudo image IMAGE_P1, the second pseudo image IMAGE_P2, and the third pseudo image IMAGE_P3.

In another example, when the quality of the second fingerprint image IMAGE2 is higher than or equal to the reference quality, the determining unit DTU may perform authentication on the second fingerprint image IMAGE2 by using the enrolled image IMAGE_E. When the quality of the second fingerprint image IMAGE2 is lower than the reference quality, the determining unit DTU may perform authentication on the second fingerprint image IMAGE2 by using at least one of the first pseudo image IMAGE_P1, the second pseudo image IMAGE_P2, and the third pseudo image IMAGE_P3.

When authentication is performed by using the template TEMP including the enrolled image IMAGE_E, according to a state of skin (e.g., when the skin is dry or when the skin is wrinkled or contracted) or an authentication environment (e.g., when surroundings are very bright or dark), the accuracy of fingerprint recognition may be lowered or degraded, and fingerprint authentication may not be successfully performed. In particular, the fingerprint authentication may not be successfully performed for a long time, until before the state of skin is recovered to a normal state or before the authentication environment is changed to a general authentication environment.

Therefore, the controller CON (or the fingerprint authentication device FDD) may set an image conversion model through various learnings (i.e., the pre-learning, the real-time learning, and the complex learning), generate a pseudo image IMAGE_P corresponding to an enrolled image IMAGE_E by the image conversion model and then add the pseudo image IMAGE_P to a template TEMP, perform fingerprint authentication by using the template TEMP including the pseudo image IMAGE_P. Thus, although the state of skin of the user or the authentication environment is not normal, the fingerprint authentication may be normally performed.

In particular, the controller CON may convert an enrolled image IMAGE_E into a pseudo image IMAGE_P by using an image conversion model, and add the pseudo image IMAGE_P to a template TEMP. In other words, this is different from that a low-quality fingerprint image (e.g., a third fingerprint image IMAGE3) sensed through the sensor PS is simply added to the template TEMP. When a low-quality fingerprint image sensed in a specific authentication environment is added to the template TEMP, the low-quality fingerprint image is used in only the corresponding authentication environment, and may not properly used in another authentication environment. For example, in the descriptions, the controller CON may generate a pseudo image IMAGE_P (e.g., a new fingerprint image for authentication) to which various conditions (e.g., a state of skin and an authentication environment) is reflected. Thus, the fingerprint authentication may be accurately performed on a state of skin of a user or an authentication environment, which is not considered in fingerprint enrollment.

In some exemplary embodiments, the image processing unit IPU may convert the second fingerprint image IMAGE2 into a fourth fingerprint image (e.g., a fingerprint image having an improved quality) by reversely using the image conversion model, and the determining unit DTU may compare the fourth fingerprint image with the template TEMP. Generation and authentication of the fourth fingerprint image will be described later with reference to FIG. 16.

Figure 11:
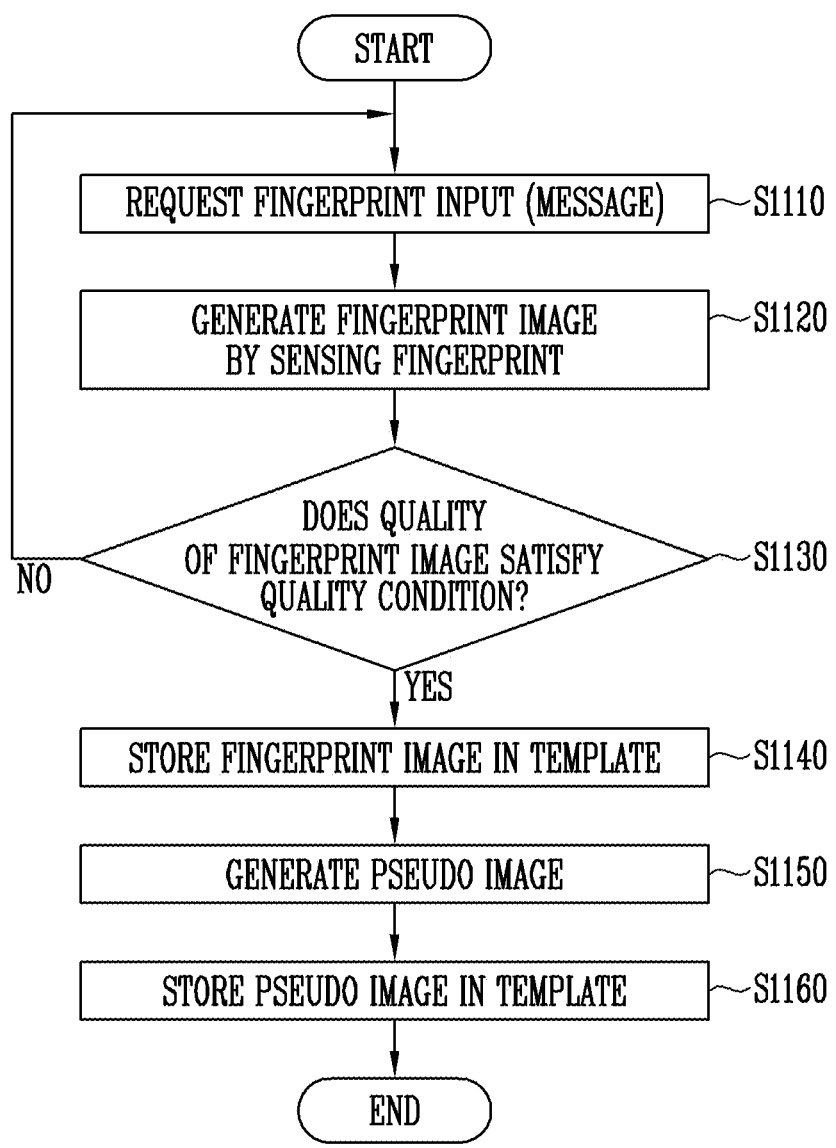
FIG. 11 is a flowchart illustrating an exemplary embodiment of a method of authenticating a fingerprint according to the principles of the invention.
Figure 12:
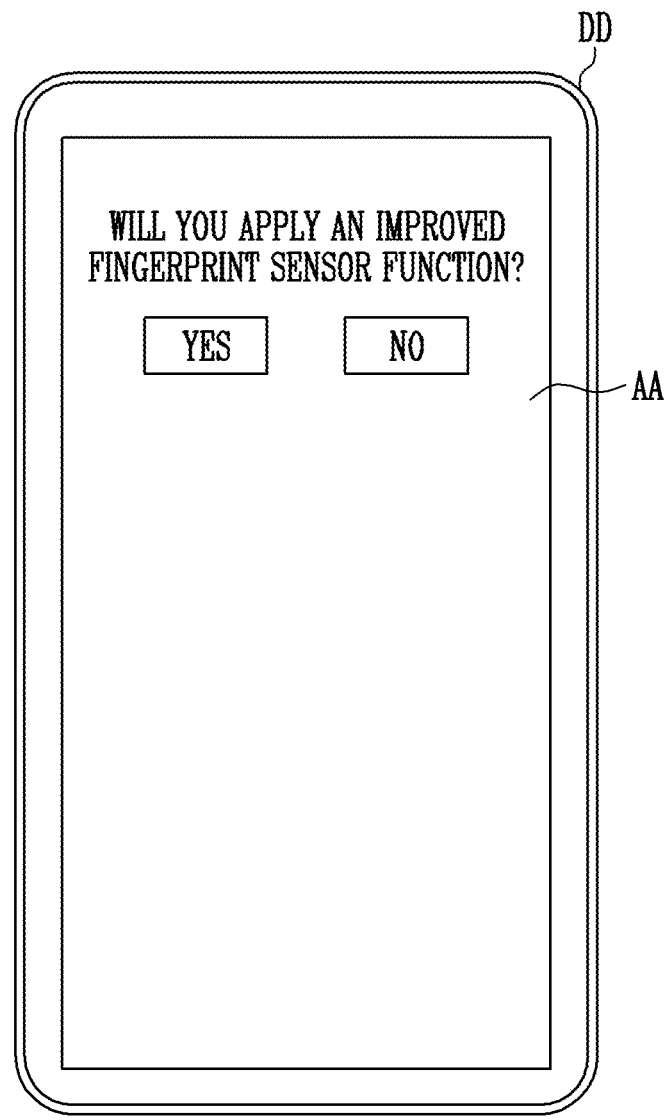
FIG. 12 is a diagram illustrating an example of step of requesting a fingerprint input, which is included in the method of FIG. 11.

FIG. 11 is a flowchart illustrating an exemplary embodiment of a method of authenticating a fingerprint according to the principles of the invention. FIG. 12 is a diagram illustrating an example of step of requesting a fingerprint input, which is included in the method of FIG. 11.

Referring to FIGS. 1A, 3, 5, and 11, the method shown in FIG. 11 may be performed by the display device DD shown in FIG. 1A or the fingerprint authentication device FDD shown in FIG. 3.

The method shown in FIG. 11 may request a fingerprint input from a user (S1110).

For example, the method shown in FIG. 11 may display a message or image for requesting the fingerprint input in the display area AA of the display device DD, or display an image (e.g., a fingerprint image) for requesting the fingerprint input in the fingerprint sensing area FSA of the display device DD.

In some exemplary embodiments, the method shown in FIG. 11 may request generation of a pseudo image IMAGE P or request approval for extension of a template TEMP. For example, as shown in FIG. 12, the method shown in FIG. 11 may display a message (or image) for requesting approval for extension of a template TEMP in the display area AA of the display device DD. When an input of approving the extension of the template TEMP is received, the method shown in FIG. 11 may perform an operation for generating a pseudo image IMAGE_P by using an image conversion model through the various learnings (e.g., the pre-learning, the real-time learning, and the complex learning) described with reference to FIG. 5, and adding the pseudo image IMAGE P to the template TEMP or extending the template TEMP.

When an input (e.g., a touch) to the fingerprint sensing area FSA of the display device DD occurs from the user, the method shown in FIG. 11 may generate a fingerprint image by sensing a fingerprint (S1120).

As described with reference to FIG. 5, the sensor PS may generate a sensing signal SS corresponding to the fingerprint by using an optical method, an ultrasonic method, or the like, and the image processing unit IPU may generate a fingerprint image (e.g., a first fingerprint image IMAGE1) based on the sensing signal SS.

The method shown in FIG. 11 may determine whether a quality of the fingerprint image satisfies a predetermined quality condition (S1130). When the quality of the fingerprint image satisfies the quality condition, the method shown in FIG. 11 may store the fingerprint image (e.g., a fingerprint image including at least a portion of the first fingerprint image IMAGE1) in the template TEMP (S1140).

As described with reference to FIG. 5, when a quality of the first fingerprint image IMAGE1 is higher than or equal to a predetermined reference quality (e.g., reference quality value), the determining unit DTU may generate an enrolled image IMAGE_E including at least a portion of the first fingerprint image IMAGE1, and add the enrolled image IMAGE E to or store the enrolled image IMAGE E in the template TEMP.

When the quality of the first fingerprint image IMAGE1 is lower than the reference quality, the determining unit DTU may re-acquire a first fingerprint image IMAGE1 through the sensor PS and the image processing unit IPU, and again determine whether a quality of the re-acquired first fingerprint image IMAGE1 satisfies a quality condition.

Subsequently, the method shown in FIG. 11 may generate a pseudo image IMAGE_P from the enrolled image IMAGE_E by using an image conversion model (S1150), and add the pseudo image IMAGE_P to the template TEMP or extend the template TEMP by using the pseudo image IMAGE_P (S1160).

As described with reference to FIG. 5, the method shown in FIG. 11 may set an image conversion model through various learnings (e.g., the pre-learning, the real-time learning, and the complex learning), and add a pseudo image IMAGE_P corresponding to the enrolled image IMAGE_E to the template TEMP or extending the template TEMP by using the image conversion model. Subsequently, the method shown in FIG. 11 performs fingerprint authentication by using the template TEMP including the pseudo image IMAGE_P, so that the fingerprint authentication may be normally performed, even when a state of skin of the user or an authentication environment is not normal.

Various exemplary embodiments in which a pseudo image is generated and then added to a template will be described with reference to FIGS. 13, 14, and 15.

Figure 13:
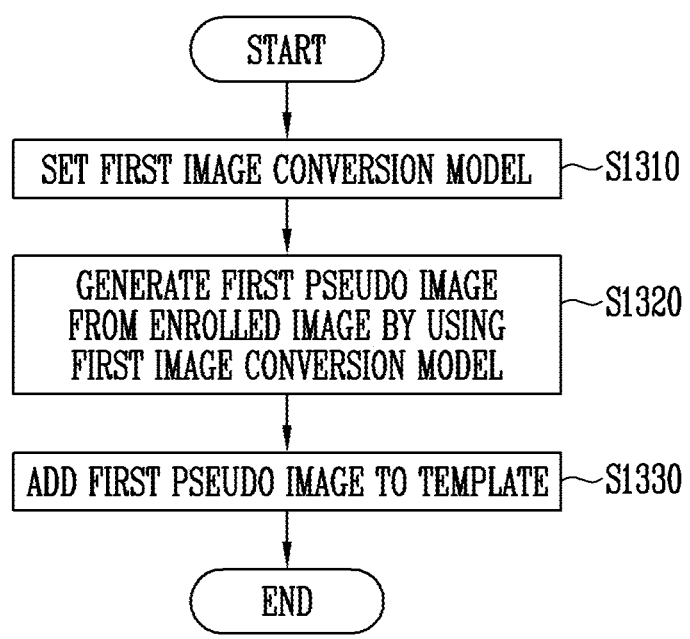
FIG. 13 is a flowchart illustrating another exemplary embodiment of a method of authenticating a fingerprint according to the principles of the invention.

FIG. 13 is a flowchart illustrating another exemplary embodiment of a method of authenticating a fingerprint according to the principles of the invention. In FIG. 13, a method of authenticating a fingerprint is illustrated based on pre-learning.

Referring to FIGS. 5, 11, and 13, the method shown in FIG. 13 may set or update a first image conversion model through learning of fingerprint images IMAGE_L for learning, which are provided from the outside (e.g., a database) (S1310).

The method shown in FIG. 13 may converts an enrolled image IMAGE E into a first pseudo image IMAGE_P1 by using the first image conversion model (S1320), and add the first pseudo image IMAGE_P1 to a template TEMP or extend the template TEMP by using the first pseudo image IMAGE_P1 (S1330).

Figure 14:
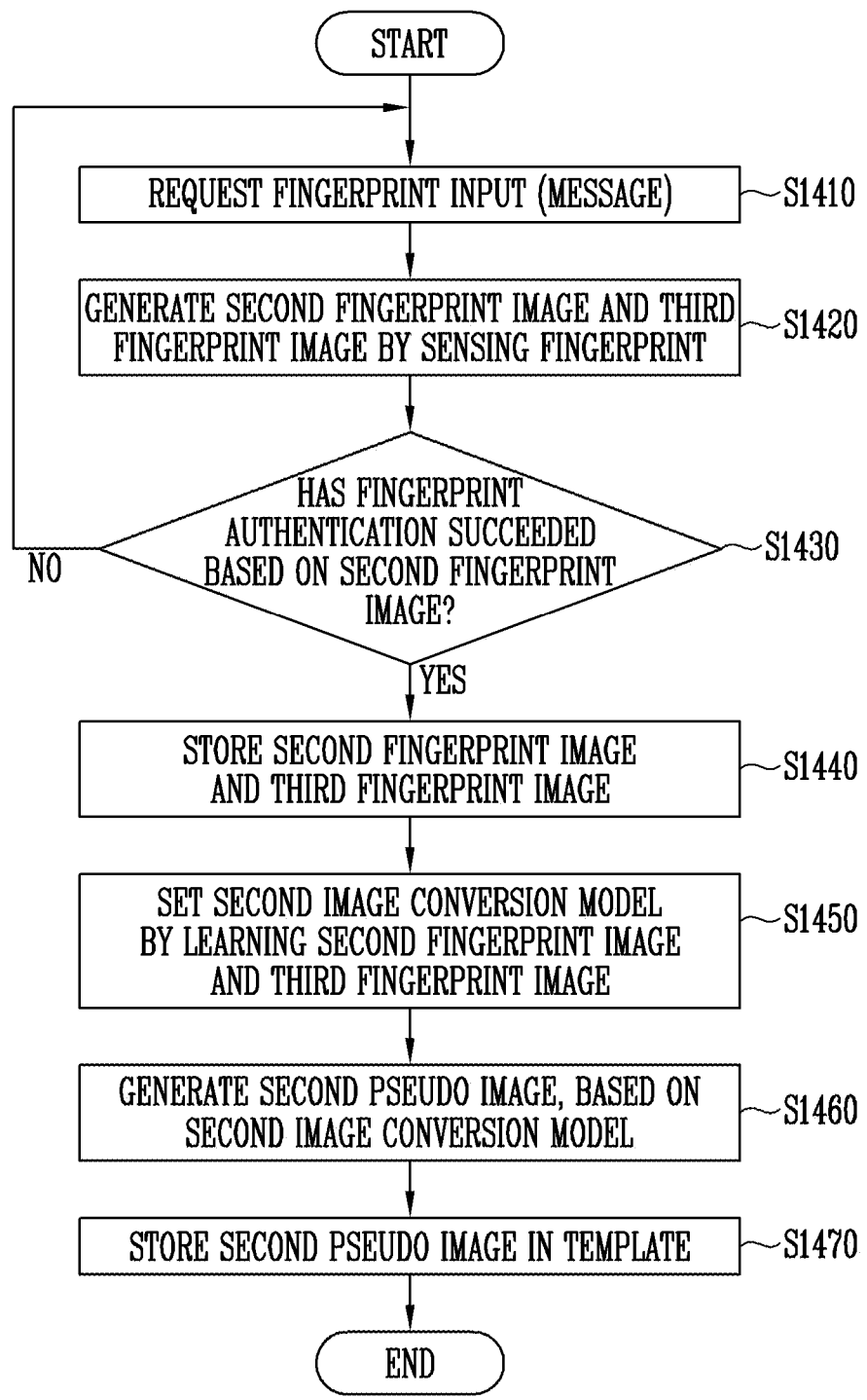
FIG. 14 is a flowchart illustrating another exemplary embodiment of a method of authenticating a fingerprint according to the principles of the invention.

FIG. 14 is a flowchart illustrating a method of authenticating a fingerprint in accordance with another exemplary embodiment. In FIG. 14, a method of authenticating a fingerprint will be illustrated based on real-time learning.

Referring to FIGS. 1A, 3, 5, 11, and 14, the method shown in FIG. 14 may request a fingerprint input from a user (S1410), and sense a fingerprint corresponding to the fingerprint input.

The method shown in FIG. 14 may acquire a second fingerprint image IMAGE2 and a third fingerprint image IMAGE3 by sensing fingerprint while changing a driving condition of the sensor PS (S1420).

In an exemplary embodiment, as described with reference to FIGS. 5 and 10, when the sensor PS is implemented as a photo sensor, the sensor PS may generate a sensing signal SS with an exposure time of about 100 ms, and the image processing unit IPU may generate a relatively high-quality second image IMAGE2_1. Also, the sensor PS may generate a sensing signal SS with an exposure time of about 60 ms in response to a driving control signal, and image processing unit IPU may generate a relatively low-quality third image IMAGE3_1.

In an exemplary embodiment, as described with reference to FIGS. 5 and 10, when the sensor PS is implemented as a photo sensor, the sensor PS may generate a sensing signal with an exposure time of about 100 ms, and the image processing unit IPU may generate a relatively high-quality second image IMAGE2_1. Also, the sensor PS may generate a sensing signal with an exposure time of about 60 ms in response to a driving control signal, and image processing unit IPU may generate a relatively low-quality third image IMAGE3_1.

In another exemplary embodiment, as described with reference to FIGS. 5 and 10, when the sensor PS is implemented as an ultrasonic sensor, the sensor PS may emit an ultrasonic signal having a frequency of about 12 MHz, and the image processing unit IPU may generate a relatively high-quality second image IMAGE2_2. Also, the sensor PS may emit an ultrasonic signal having a frequency of about 10 MHz in response to a driving control signal, and the image processing unit IPU may generate a relatively low-quality third image IMAGE3_2.

Subsequently, the method shown in FIG. 14 may perform fingerprint authentication based on the second fingerprint image IMAGE2 (S1430).

When the fingerprint authentication is not successfully performed or when the fingerprint authentication fails, the method shown in FIG. 14 may repeatedly perform the step S1410 of requesting the fingerprint input to the step S1430 of performing the fingerprint authentication.

When the fingerprint authentication is successfully performed, the method shown in FIG. 14 may store the second fingerprint image IMAGE2 and the third fingerprint image IMAGE3 (S1440), and set or update a second image conversion model by learning of the second fingerprint image IMAGE2 and the third fingerprint image IMAGE3 (S1450), and generate a second pseudo image IMAGE_P2 based on the second image conversion model (S1460).

Subsequently, the method shown in FIG. 14 may add the second pseudo image IMAGE_P2 to the template TEMP or extend the template TEMP by using the second pseudo image IMAGE_P2 (S1470).

As described with reference to FIG. 14, the method shown in FIG. 14 may set or update a second image conversion model through real-time learning, generate a second pseudo image IMAGE_P2 corresponding to an enrolled image IMAGE_E by using the second image conversion model, and add the second pseudo image IMAGE_P2 to the template TEMP or extend the template TEMP.

Figure 15:
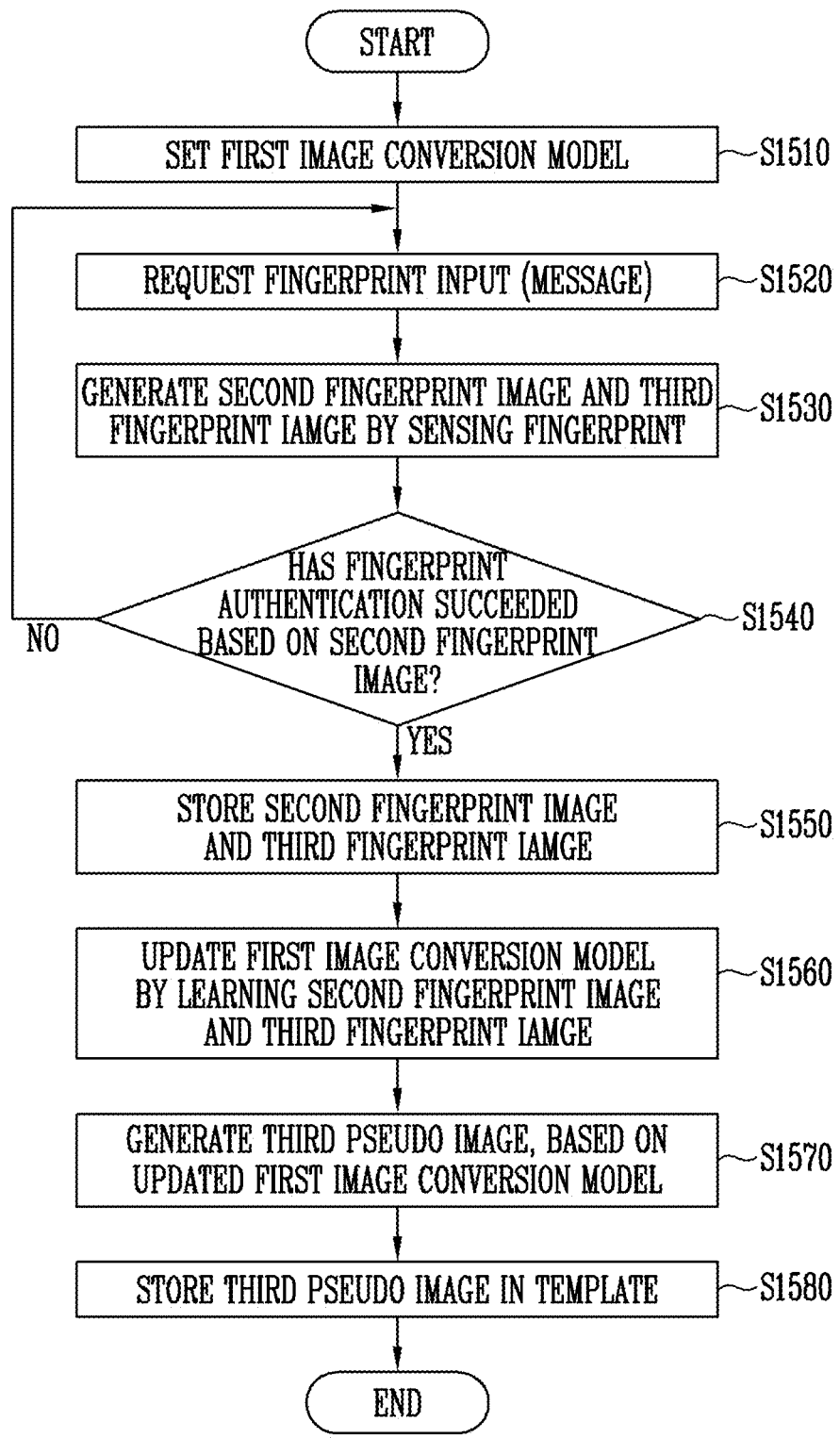
FIG. 15 is a flowchart illustrating another exemplary embodiment of a method of authenticating a fingerprint according to the principles of the invention.

FIG. 15 is a flowchart illustrating another exemplary embodiment of a method of authenticating a fingerprint according to the principles of the invention. In FIG. 15, a method of authenticating a fingerprint is illustrated based on complex learning.

Referring to FIGS. 1A, 3, 5, 11, 13, 14, and 15, the method shown in FIG. 15 may set a first image conversion model through learning of fingerprint images IMAGE_L for learning, which are provided from the outside (e.g., a database) (S1510).

The method shown in FIG. 15 may request a fingerprint input from a user (S1520), and acquire a second fingerprint image IMAGE2 and a third fingerprint image IMAGE3 while changing a driving condition of the sensor PS (S1530).

Subsequently, the method shown in FIG. 15 may perform fingerprint authentication based on the second fingerprint image IMAGE2 (S1540).

When the fingerprint authentication is successfully performed, the method shown in FIG. 15 may store the second fingerprint image IMAGE2 and the third fingerprint image IMAGE3 (S1550), update the first image conversion model by learning of the second fingerprint image IMAGE2 and the third fingerprint image IMAGE3 (S1560), and generate a third pseudo image IMAGE_P3 by using the updated first image conversion model (S1570).

Subsequently, the method shown in FIG. 15 may add the third pseudo image IMAGE_P3 to a template TEMP or extend the template TEMP by using the third pseudo image IMAGE_P3 (S1580).

As described with reference to FIG. 15, the method shown in FIG. 15 may update a first image conversion model through complex learning, generate a third pseudo image IMAGE_P3 corresponding to an enrolled image IMAGE_E by using the updated first image conversion model, and add the third pseudo image IMAGE_P3 to the template TEMP or extend the template TEMP.

Figure 16:
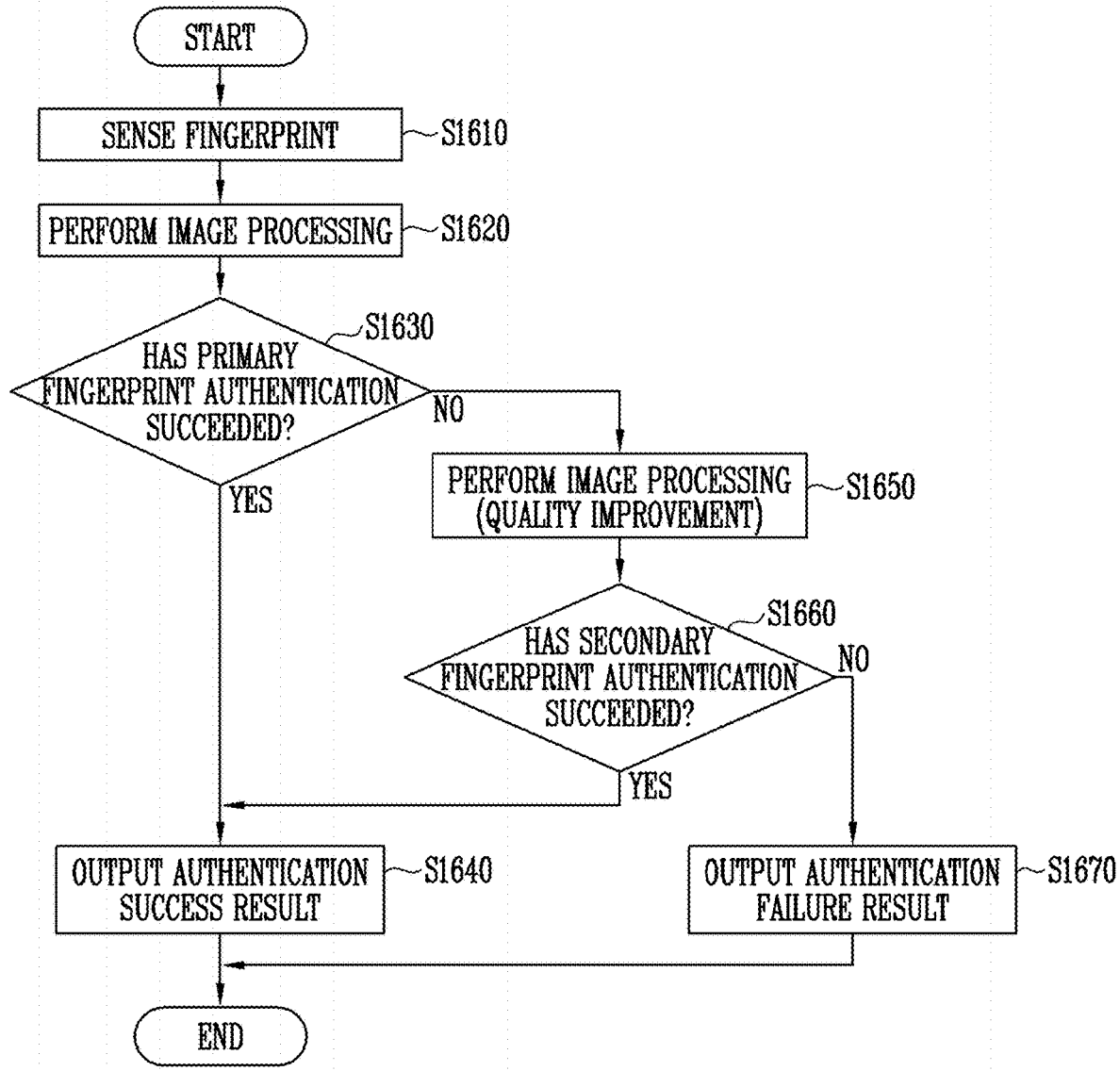
FIG. 16 is a flowchart illustrating another exemplary embodiment of a method of authenticating a fingerprint according to the principles of the invention.

FIG. 16 is a flowchart illustrating another exemplary embodiment of a method of authenticating a fingerprint according to the principles of the invention.

Referring to FIGS. 1A, 3, 5, 11, 13, 14, 15, and 16, the method shown in FIG. 16 may be performed by the display device DD shown in FIG. 1A or the fingerprint authentication device FDD. Also, the method shown in FIG. 16 may be performed after the method shown in FIG. 11 is performed. For example, the method shown in FIG. 16 may be formed after an image conversion model is set through various learnings.

The method shown in FIG. 16 may sense a fingerprint (S1610). As described with reference to FIG. 14, the method shown in FIG. 16 may request a fingerprint input from a user, and sense a fingerprint corresponding to the fingerprint input.

The method shown in FIG. 16 may perform image processing on a fingerprint image generated through the fingerprint sensing operation (S1620).

For example, as described with reference to FIG. 5, the method shown in FIG. 16 may perform image processing including a smoothing operation, a binarization operation, a thinning operation, and the like on the fingerprint image through the image processing unit IPU.

Subsequently, the method shown in FIG. 16 may perform primary fingerprint authentication based on the fingerprint image (e.g., a second fingerprint image IMAGE2) (S1630). For example, the method shown in FIG. 16 may perform the primary fingerprint authentication by comparing the fingerprint image with a template TEMP (e.g., an enrolled image IMAGE_E, a first pseudo image IMAGE_P1, a second pseudo image IMAGE_P2, and a third pseudo image IMAGE_P3).

When the primary fingerprint authentication is successfully performed, the method shown in FIG. 16 may output an authentication success result indicating that the fingerprint authentication has been successfully performed to the outside (e.g., a host processor) (S1640).

When the primary fingerprint authentication is not successfully performed (or when the primary fingerprint authentication fails), the method shown in FIG. 16 may perform image processing on the fingerprint image (S1650).

In an exemplary embodiment, the method shown in FIG. 16 may convert the fingerprint image (e.g., the second fingerprint image IMAGE2) into a high-quality fingerprint image by reversely using the image conversion model described with reference to FIG. 9. For example, the method shown in FIG. 16 may generate a fingerprint image having an improved quality by reversely using the image conversion model, in consideration of a situation in which the primary fingerprint authentication fails as the quality of the fingerprint image is low.

Subsequently, the method shown in FIG. 16 may perform secondary fingerprint authentication based on the high-quality fingerprint image (S1660). The secondary fingerprint authentication may be substantially identical to the primary fingerprint authentication. For example, the method shown in FIG. 16 may perform the second fingerprint authentication by comparing the high-quality fingerprint image with the template TEMP (e.g., the enrolled image IMAGE_E, the first pseudo image IMAGE_P1, the second pseudo image IMAGE_P2, and the third pseudo image IMAGE_P3).

For example, in addition to that a low-quality pseudo image IMAGE_P is added to a template TEMP or that the template TEMP is extended, by expecting that a low-quality fingerprint image will be generated according to a state of skin and an authentication environment, the method shown in FIG. 16 may improve the quality of a fingerprint image through image processing on the low-quality fingerprint image. Also, the method shown in FIG. 16 may additionally perform fingerprint authentication based on the extended template TEMP and the fingerprint image having the improved quality. Thus, the fingerprint authentication may be more successfully performed.

Like when the primary fingerprint authentication is successfully performed, when the secondary fingerprint authentication is successfully performed, the method shown in FIG. 16 may output an authentication success result indicating that the fingerprint authentication has been successfully performed to the outside (e.g., the host processor) (S1640).

When the secondary fingerprint authentication is not successfully performed or when the secondary fingerprint authentication fails, the method shown in FIG. 16 may output an authentication failure result indicating that the fingerprint authentication has failed to the outside (e.g., the host processor) (S1670).

For example, although a case where the image processing for improving the quality of the fingerprint image is performed (S1650) has been illustrated in FIG. 16, exemplary embodiments are not limited thereto. For example, the image processing for improving the quality of the fingerprint image may be included in the step S1620. In the step S1620 of performing the image processing for improving the quality of the fingerprint image, each of a fingerprint image and a high-quality fingerprint image may be generated. In the step S1630 of performing the primary fingerprint authentication, fingerprint authentication may be performed based on the fingerprint image. When the primary fingerprint authentication fails, in the step S1660 of performing the secondary fingerprint authentication, the fingerprint authentication may be again performed based on the high-quality fingerprint image. For example, the image processing for improving the quality of the fingerprint image may be performed without limitation between the step S1610 of sensing the fingerprint and the step S1660 of performing the secondary fingerprint authentication.

In the fingerprint authentication device, the display device including the same, and the method of authenticating the fingerprint in accordance with the present disclosure, a low-quality pseudo image is generated from an enrolled fingerprint image through learning of various fingerprint images, and is added to a template in addition to the enrolled fingerprint image, so that the template may be extended. Fingerprint authentication is performed by using the extended template, so that the accuracy of the fingerprint authentication may be improved even when a state of skin of a user and an authentication environment are changed.

In particular, in the fingerprint authentication device, the display device including the same, and the method of authenticating the fingerprint in accordance with the illustrated exemplary embodiments, a pseudo image may be generated through processing of enrolled fingerprint image, instead of a low-quality fingerprint image which was authenticated or acquired in the past. Thus, the accuracy of fingerprint authentication may be improved with respect to more various states of skin of users and more various authentication environments.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A fingerprint authentication device comprising:
  a sensor unit configured to output a sensing signal by sensing a fingerprint;
  an image processing unit configured to generate a fingerprint image based on the sensing signal;
  a storage unit configured to store a template including an enrolled image;
  a learning unit configured to generate a first pseudo image and add the first pseudo image to the template; and
  an authentication unit configured to compare the fingerprint image generated by the image processing unit with the template, and configured to output a comparison result,
  wherein a signal-to-noise ratio of the first pseudo image is smaller than that of the enrolled image,
  wherein the learning unit is configured to convert the enrolled image into the first pseudo image by using a first image conversion model,
  wherein the image processing unit is configured to generate a first fingerprint image in a fingerprint enrollment period, and is configured to generate a second fingerprint image in a fingerprint authentication period, wherein the enrolled image includes at least a portion of the first fingerprint image, wherein the first pseudo image is different from the second fingerprint image, wherein the learning unit is configured to set the first image conversion model through learning of fingerprint images for learning, which are provided from outside of the fingerprint authentication device, wherein the fingerprint images for learning include high-quality fingerprint images of which signal-to-noise ratios are within a reference quality range and low-quality fingerprint images of which signal-to-noise ratios are out of the reference quality range with respect to a plurality of objects, wherein the image processing unit is configured to generate a third fingerprint image corresponding to the second fingerprint image while changing a driving condition of the sensor unit in the fingerprint authentication period, the second fingerprint image and the third fingerprint image obtained from a substantially same fingerprint, wherein a signal-to noise ratio of the third fingerprint image is smaller than that of the second fingerprint image, and wherein the storage unit is configured to store the second fingerprint image and the third fingerprint image based on the comparison result of the authentication unit.

2. The fingerprint authentication device of claim 1, wherein the sensor unit includes a photo sensor to configured to sense light reflected by the fingerprint, wherein the image processing unit is configured to generate the second fingerprint image by receiving the reflected light for a first exposure time through the sensor unit, and wherein the image processing unit is configured to generate the third fingerprint image by receiving the reflected light for a second exposure time through the sensor unit.

3. The fingerprint authentication device of claim 2, wherein the second exposure time is shorter than the first exposure time.

4. The fingerprint authentication device of claim 1, wherein the sensor unit includes an ultrasonic sensor configured to sense an ultrasonic wave reflected by the fingerprint, wherein the image processing unit is configured to generate the second fingerprint image by emitting an ultrasonic wave having a first frequency through the sensor unit, and wherein the image processing unit is configured to generate the third fingerprint image by emitting an ultrasonic wave having a second frequency through the sensor unit.

5. The fingerprint authentication device of claim 4, wherein the second frequency is lower than the first frequency.

6. The fingerprint authentication device of claim 1, wherein the learning unit is configured to set a second image conversion model by learning of the second fingerprint image and the third fingerprint image, is configured to convert the first fingerprint image into a second pseudo image by using the second image conversion model, and is configured to add the second pseudo image to the template.

7. The fingerprint authentication device of claim 1, wherein the learning unit is configured to update the first image conversion model by additionally learning of the second fingerprint image and the third fingerprint image, is configured to convert the first fingerprint image into a third pseudo image by using the updated first fingerprint image model, and is configured to add the third pseudo image to the template.

8. The fingerprint authentication device of claim 1, wherein the image processing unit is configured to generate a converted fingerprint image by increasing a signal-to-noise ratio of the fingerprint image, by reversely using the first image conversion model, and wherein the authentication unit is configured to compare the converted fingerprint image with the template.

9. The fingerprint authentication device of claim 8, wherein the authentication unit is configured to compare the converted fingerprint image with the template based on a first comparison result obtained by comparing the fingerprint image with the template, and is configured to output a second comparison result.

10. A fingerprint authentication device comprising:

a sensor unit configured to output a sensing signal by sensing a fingerprint;

an image processing unit configured to generate a fingerprint image based on the sensing signal;

a storage unit configured to store a template including an enrolled image; and a learning unit configured to generate a first pseudo image and add the first pseudo image to the template, wherein a signal-to-noise ratio of the first pseudo image is smaller than that of the enrolled image, wherein the learning unit is configured to convert the enrolled image into the first pseudo image by using a first image conversion model, wherein the image processing unit is configured to generate a first fingerprint image in a fingerprint enrollment period, and is configured to generate a second fingerprint image in a fingerprint authentication period, wherein the enrolled image includes at least a portion of the first fingerprint image, wherein the first pseudo image is different from the second fingerprint image, wherein the image processing unit is configured to further generates a third fingerprint image corresponding to the second fingerprint image while changing a driving condition of the sensor unit in the fingerprint authentication period, the second fingerprint image and the third fingerprint image obtained from a substantially same fingerprint, wherein the learning unit is configured to set or update the first image conversion model by learning of at least one of the first and second fingerprint images and the third fingerprint image, and wherein a signal-to-noise ratio of the third fingerprint image is smaller than that of the second fingerprint image.

11. The fingerprint authentication device of claim 10, wherein the sensor unit includes a photo sensor configured to sense light reflected by the fingerprint, wherein the image processing unit is configured to generate the second fingerprint image by receiving the reflected light for a first exposure time through the sensor unit, and wherein the image processing unit is configured to generate the third fingerprint image by receiving the reflected light for a second exposure time through the sensor unit.

12. The fingerprint authentication device of claim 10, wherein the sensor unit includes an ultrasonic sensor configured to sense an ultrasonic wave reflected by the fingerprint,
- wherein the image processing unit is configured to generate the second fingerprint image by emitting an ultrasonic wave having a first frequency through the sensor unit, and
- wherein the image processing unit is configured to generate the third fingerprint image by emitting an ultrasonic wave having a second frequency through the sensor unit.

13. A method of authenticating a fingerprint, the method comprising the steps of:
- generating a first fingerprint image of a first object through a sensor unit;
- adding, to a template, an enrolled image including at least a portion of the first fingerprint image;
- generating a pseudo image based on the enrolled image;
- adding the pseudo image to the template;
- generating a second fingerprint image through the sensor unit; and
- comparing the second fingerprint image with the template and outputting a comparison result,
- wherein a signal-to-noise ratio of the pseudo image is smaller than that of the enrolled image,
- wherein the step of generating of the second fingerprint image includes the step of generating a third fingerprint image corresponding to the second fingerprint image while changing a driving condition of the sensor unit, the second fingerprint image and the third fingerprint image obtained from a substantially same object, and
- wherein a signal-to-noise ratio of the third fingerprint image is lower than that of the second fingerprint image.

14. The method of claim 13, wherein the step of generating of the pseudo image includes the steps of:
- setting a first image conversion model through learning of a fingerprint; and
- converting the enrolled image into the pseudo image by using the first image conversion model, and
- wherein the enrolled images include high-quality fingerprint images of which signal-to-noise ratios are within a reference quality range and low-quality fingerprint images of which signal-to-noise ratios are out of the reference quality range, with respect to a plurality of objects.

15. The method of claim 13, further comprising the steps of:
- storing the second fingerprint image and the third fingerprint image based on the comparison result;
- setting a second image conversion model by learning of the second fingerprint image and the third fingerprint image;
- converting the enrolled image into a second pseudo image by using the second image conversion model; and
- adding the second pseudo image to the template.

16. The method of claim 15, wherein the sensor unit includes a photo sensor configured to sense light reflected by a fingerprint, and
- wherein the step of generating of the third fingerprint image includes the steps of:
- generating the second fingerprint image by receiving the reflected light for a first exposure time through the sensor unit; and
- generating the third fingerprint image by receiving the reflected light for a second exposure time through the sensor unit.

17. The method of claim 15, wherein the sensor unit includes an ultrasonic sensor configured to sense an ultrasonic wave reflected by a fingerprint, and
- wherein the step of generating of the third fingerprint image includes the steps of:
- generating the second fingerprint image by emitting an ultrasonic wave having a first frequency through the sensor unit; and
- generating the third fingerprint image by emitting an ultrasonic wave having a second frequency through the sensor unit.

18. The method of claim 13, further comprising the steps of:
- generating a converted fingerprint image by increasing a signal-to-noise ratio of the second fingerprint image, using an image conversion model based on the first comparison result; and
- comparing the converted fingerprint image with the template and outputting a second comparison result.

19. A method of authenticating a fingerprint, the method comprising the steps of:
- generating a first fingerprint image of a first object through a sensor unit;
- adding, to a template, an enrolled image including at least a portion of the first fingerprint image;
- generating a pseudo image based on the enrolled image;
- adding the pseudo image to the template;
- setting a first image conversion model through learning of fingerprint images;
- generating fingerprint images having different signal-to-noise ratios with respect to a first object while changing a driving condition of the sensor unit; and
- updating the first image conversion model by learning of the fingerprint images,
- wherein a signal-to-noise ratio of the pseudo image is smaller than that of the enrolled image.

* * * * *